(12) United States Patent
Nahum

(10) Patent No.: US 10,871,366 B2
(45) Date of Patent: Dec. 22, 2020

(54) SUPPLEMENTARY METROLOGY POSITION COORDINATES DETERMINATION SYSTEM FOR USE WITH A ROBOT

(71) Applicant: Mitutoyo Corporation, Kanagawa-ken (JP)

(72) Inventor: Michael Nahum, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 293 days.

(21) Appl. No.: 16/146,640

(22) Filed: Sep. 28, 2018

(65) Prior Publication Data

US 2020/0056878 A1  Feb. 20, 2020

Related U.S. Application Data

(63) Continuation-in-part of application No. 16/104,033, filed on Aug. 16, 2018, now Pat. No. 10,751,883.

(51) Int. Cl.
*G01B 11/00* (2006.01)
*B25J 9/16* (2006.01)
*B25J 17/02* (2006.01)

(52) U.S. Cl.
CPC ........ *G01B 11/002* (2013.01); *B25J 9/1666* (2013.01); *B25J 9/1697* (2013.01); *B25J 17/0258* (2013.01)

(58) Field of Classification Search
CPC .... G01B 11/002; G01B 5/008; B25J 17/0258; B25J 9/1666; B25J 9/1697; B25J 9/023; B25J 9/1602; B25J 9/1656; B25J 18/00; B25J 19/023; G05B 2219/39045; G05B 2219/39008; G05B 2219/37098
(Continued)

(56) References Cited

U.S. PATENT DOCUMENTS 4,613,943 A  9/1986 Miyake et al.
4,725,965 A  2/1988 Keenan
(Continued)

OTHER PUBLICATIONS

Krajník et al., "External Localization System for Mobile Robotics," 16th *International Conference on Advanced Robotics (ICAR)*, Nov. 25-29, 2013, Montevideo, Uruguay. (6 Pages).
(Continued)

*Primary Examiner* — Jaime Figueroa
(74) *Attorney, Agent, or Firm* — Seed IP Law Group LLP

(57) ABSTRACT

A supplementary metrology position coordinates determination system is provided for use with a robot. A first accuracy level defined as a robot accuracy (e.g., for controlling and sensing an end tool position of an end tool that is mounted proximate to a distal end of a movable arm configuration of the robot) is based on using position sensors (e.g., encoders) included in the robot. The supplementary metrology position coordinates determination system includes an imaging configuration, XY scale, image triggering portion and processing portion. One of the XY scale or imaging configuration is coupled to the movable arm configuration and the other is coupled to a stationary element (e.g., a frame above the robot). The imaging configuration acquires an image of the XY scale, which is utilized to determine metrology position coordinates that are indicative of the end tool position, with an accuracy level that is better than the robot accuracy.

21 Claims, 13 Drawing Sheets

(58) Field of Classification Search
USPC .................................................. 700/245, 259
See application file for complete search history.

(56) References Cited

U.S. PATENT DOCUMENTS

| | | | |
|---|---|---|---|
| 5,105,368 | A | 4/1992 | Alexandersen et al. |
| 5,297,238 | A | 3/1994 | Wang et al. |
| 5,617,335 | A | 4/1997 | Hashima et al. |
| 5,798,947 | A | 8/1998 | Ye et al. |
| 5,876,325 | A | 3/1999 | Mizuno et al. |
| 6,222,940 | B1 | 4/2001 | Wenzel et al. |
| 6,640,008 | B1 | 10/2003 | Lee et al. |
| 6,681,151 | B1 | 1/2004 | Weinzimmer et al. |
| 6,781,694 | B2 | 8/2004 | Nahum et al. |
| 6,937,349 | B2 | 8/2005 | Jones et al. |
| 7,105,753 | B1 | 9/2006 | Lapstun et al. |
| 7,532,949 | B2 | 5/2009 | Ban et al. |
| 7,845,560 | B2 | 12/2010 | Emanuel et al. |
| 8,792,963 | B2 | 7/2014 | Zhao et al. |
| 8,981,324 | B2 | 3/2015 | Rigney et al. |
| 9,050,728 | B2 | 6/2015 | Ban et al. |
| 9,572,549 | B2 | 2/2017 | Belevich et al. |
| 10,058,996 | B2 | 8/2018 | Hosek et al. |
| 10,099,380 | B2 | 10/2018 | Ishige et al. |
| 10,625,427 | B2 * | 4/2020 | Troy ..................... B25J 9/1692 |
| 2003/0144765 | A1 | 7/2003 | Habibi et al. |
| 2005/0225278 | A1 | 10/2005 | Ban et al. |
| 2006/0017022 | A1 | 1/2006 | Rigney et al. |
| 2009/0180667 | A1 | 7/2009 | Mahan et al. |
| 2009/0234502 | A1 | 9/2009 | Ueyama et al. |
| 2010/0331855 | A1 | 12/2010 | Zhao et al. |
| 2011/0029131 | A1 | 2/2011 | Ban et al. |
| 2013/0035791 | A1 | 2/2013 | Chiu et al. |
| 2013/0090554 | A1 | 4/2013 | Zvuloni et al. |
| 2013/0123982 | A1 | 5/2013 | Chiu et al. |
| 2014/0157610 | A1 * | 6/2014 | Garvey ................ G05B 19/401 33/503 |
| 2014/0301632 | A1 | 10/2014 | Ikeda et al. |
| 2015/0158181 | A1 | 6/2015 | Kawamura et al. |
| 2016/0008988 | A1 | 1/2016 | Kennedy et al. |
| 2016/0039096 | A1 | 2/2016 | Wallack et al. |
| 2016/0136812 | A1 | 5/2016 | Hosek et al. |
| 2016/0151915 | A1 | 6/2016 | Nishi et al. |
| 2016/0223316 | A1 * | 8/2016 | Jordil ................... G01B 21/047 |
| 2017/0140521 | A1 * | 5/2017 | Sakaguchi ......... G06K 9/00335 |
| 2017/0148154 | A1 | 5/2017 | Nakao |
| 2017/0151671 | A1 | 6/2017 | Ishige et al. |
| 2017/0182665 | A1 | 6/2017 | Okuyama et al. |
| 2018/0004188 | A1 | 1/2018 | Yamaguchi et al. |
| 2018/0018778 | A1 * | 1/2018 | Haverkamp ........... G01B 5/008 |
| 2018/0153437 | A1 * | 6/2018 | Schwartz ............... A61B 5/068 |
| 2018/0272490 | A1 * | 9/2018 | Brenner ..................... F16F 7/04 |
| 2018/0279993 | A1 | 10/2018 | Crawford et al. |
| 2018/0361571 | A1 | 12/2018 | Georgeson et al. |
| 2018/0361595 | A1 | 12/2018 | Troy et al. |
| 2019/0005600 | A1 * | 1/2019 | Hazeyama ............... B23Q 3/18 |
| 2019/0015980 | A1 | 1/2019 | Kojima et al. |
| 2019/0056218 | A1 * | 2/2019 | Ulmer ................. G01B 11/2504 |
| 2019/0099887 | A1 * | 4/2019 | Huang .................. G01B 11/005 |
| 2019/0195607 | A1 * | 6/2019 | Nahum .................... G01B 3/20 |
| 2019/0256300 | A1 | 8/2019 | Shimamura et al. |
| 2019/0291277 | A1 * | 9/2019 | Oleynik .................... B25J 9/163 |

OTHER PUBLICATIONS

Pérez et al., "Robot Guidance Using Machine Vision Techniques in Industrial Environments: A Comparative Review," *Sensors* 16(3):335, 2016. (26 pages).

Scara, URL=https://en.wikipedia.org/w/index.php?title=SCARA&oldid=838861482, Archive Date Apr. 29, 2018. (2 pages).

* cited by examiner

SUPPLEMENTARY METROLOGY POSITION COORDINATES DETERMINATION SYSTEM FOR USE WITH A ROBOT

CROSS-REFERENCE TO RELATED APPLICATION(S)

This application is a continuation-in-part of U.S. patent application Ser. No. 16/104,033, entitled "ROBOT SYSTEM WITH SUPPLEMENTARY METROLOGY POSITION COORDINATES DETERMINATION SYSTEM" filed on Aug. 16, 2018, the disclosure of which is hereby incorporated herein by reference in its entirety.

BACKGROUND

Technical Field

This disclosure relates to robot systems, and more particularly to systems for determining coordinates of an end tool position of a robot.

Description of the Related Art

Robotic systems are increasingly utilized for manufacturing and other processes. Various types of robots that may be utilized include articulated robots, selective compliance articulated robot arm (SCARA) robots, cartesian robots, cylindrical robots, spherical robots, etc. As one example of components that may be included in a robot, a SCARA robot system (e.g., which may be a type of articulated robot system) may typically have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy of approximately 100 microns, as limited by certain factors (e.g., the rotary encoder performance in combination with the mechanical stability of the robot system, etc.)

U.S. Pat. No. 4,725,965, which is hereby incorporated herein by reference in its entirety, discloses certain calibration techniques for improving the accuracy of a SCARA system. As described in the '965 patent, a technique is provided for calibrating a SCARA type robot comprising a first rotatable arm portion and a second rotatable arm portion which carries an end tool. The calibration technique is in relation to the fact that the SCARA robot may be controlled using a kinematic model, which, when accurate, allows the arm portions to be placed in both a first and second angular configuration at which the end tool carried by the second arm portion remains at the same position. To calibrate the kinematic model, the arm portions are placed in a first configuration to locate the end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated.

As further described in the '965 patent, the calibration technique may include the use of certain cameras. For example, in one implementation, the datum point may be the center of the viewing area of a stationary television camera (i.e., located on the ground below the end tool), and the output signal of the camera may be processed to determine the shift in the position of the end tool from the center of the viewing area of the camera when the links are switched from the first to the second configuration. In another implementation, the second arm portion may carry a camera, and the technique may begin by placing the arm portions in a first angular configuration, at which a second predetermined interior angle is measured between the arm portions, to center the camera carried by the second arm portion directly above a fixed datum point. The arm portions are then placed in a second angular configuration, at which an interior angle, equal to the second predetermined interior angle, is measured between the arm portions, to nominally center the camera again above the datum point. The output signal of the camera is then processed to determine the shift in the position of the datum point, as seen by the camera, upon switching the arm portions from the first to the second angular configuration. The error in the known position of the camera is then determined in accordance with the shift in the position of the datum point as seen by the camera. The steps are then repeated as part of the calibration process until the error approaches zero.

While techniques such as those described in the '965 patent may be utilized for calibrating a robot system, in certain applications it may be less desirable to utilize such techniques (e.g., which may require significant time and/or may not provide a desired level of accuracy for all possible orientations of a robot during certain operations, etc.) A robot system that can provide improvements with regard to such issues (e.g., for increasing the reliability, repeatability, speed, etc. of the position determination during workpiece measurements and other processes) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A supplementary metrology position coordinates determination system is provided for use in conjunction with a robot as part of a robot system. The robot (e.g., an articulated robot, a SCARA robot, a cartesian robot, a cylindrical robot, a spherical robot, etc.) includes a movable arm configuration and a motion control system. The movable arm configuration includes an end tool mounting configuration that is located proximate to a distal end of the movable arm configuration. The robot is configured to move the movable arm configuration so as to move at least a portion of an end tool that is mounted to the end tool mounting configuration along at least two dimensions in an end tool working volume. The motion control system is configured to control an end tool position with a level of accuracy defined as a robot accuracy, based at least in part on sensing and controlling the position of the movable arm configuration using at least one position sensor (e.g., a rotary encoder, a linear encoder, etc.) included in the robot.

The supplementary metrology position coordinates determination system includes a first imaging configuration, an XY scale, an image triggering portion and a metrology position coordinate processing portion. The first imaging configuration includes a first camera and has an optical axis. The XY scale includes a nominally planar substrate and a plurality of respective imageable features distributed on the substrate, wherein the respective imageable features are located at respective known XY scale coordinates on the XY scale. The image triggering portion is configured to input at least one input signal that is related to the end tool position and determine the timing of a first imaging trigger signal based on the at least one input signal and to output the first imaging trigger signal to the first imaging configuration. The first imaging configuration is configured to acquire a digital image of the XY scale at an image acquisition time in response to receiving the first imaging trigger signal. The metrology position coordinate processing portion is configured to input the acquired image and identify at least one respective imageable feature included in the acquired image of the XY scale and the related respective known XY scale coordinate location. In various implementations, the XY scale may be an incremental scale or an absolute scale.

The supplementary metrology position coordinates determination system is configured with a movable one of the XY scale or the first imaging configuration coupled to the movable arm configuration and the other configured to be coupled to a stationary element proximate to the robot. The stationary one of the XY scale or the first imaging configuration defines a first reference position. A scale plane is defined to nominally coincide with the planar substrate of the XY scale, and a direction normal to the scale plane is defined as a scale imaging axis direction. The robot system is operable to at least nominally provide an operational configuration of the supplementary metrology position coordinates determination system. In the operational configuration of the supplementary metrology position coordinates determination system, at least one of the XY scale or the first imaging configuration is arranged with the optical axis of the first imaging configuration parallel to the direction of the scale imaging axis direction and with the scale plane located within the range of focus of the first imaging configuration along the scale imaging axis direction.

The supplementary metrology position coordinates determination system is configured such that when the movable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine metrology position coordinates that indicate a relative position between the movable one of the XY scale or the first imaging configuration and the first reference position with an accuracy level that is better than the robot accuracy, based on determining an image position of the identified at least one respective imageable feature in the acquired image. The determined metrology position coordinates are indicative of the end tool position at the image acquisition time, with an accuracy level that is better than the robot accuracy, at least for a vector component of the metrology position coordinates that is at least one of transverse or perpendicular to the scale imaging axis direction. In various implementations, the supplementary metrology position coordinates determination system is configured to determine the metrology position coordinates of the end tool position at the image acquisition time, based on the determined metrology position coordinates that are indicative of the relative position of the movable one of the XY scale or the first imaging configuration and a known coordinate position offset between the end tool position and the movable one of the XY scale or the first imaging configuration.

In various implementations, the movable one of the XY scale or the first imaging configuration is coupled to a central sub-portion of the movable arm configuration through a distal sub-portion comprising at least a first distal sub-portion rotating element that rotates about a first distal sub-portion rotation axis that is nominally parallel to the scale plane if the XY scale is the movable one, and nominally orthogonal to the optical axis if the first imaging configuration is the movable one. In various implementations, the central sub-portion comprises at least a first central sub-portion rotating element that rotates about a rotation axis that is nominally parallel to the first distal sub-portion rotation axis. In various implementations, the distal sub-portion comprises a bracket that couples the movable one of the XY scale or the first imaging configuration to the first distal sub-portion rotating element. In various implementations, the robot is configured to move the end tool and the movable one of the XY scale or the first imaging configuration in a plane parallel to the scale plane, while the supplementary metrology position coordinates determination system is in the operational configuration.

In various implementations, the XY scale may be coupled to the movable arm configuration and the first imaging configuration may be coupled to the stationary element. In various implementations, the stationary element may comprise a frame arranged above at least a portion of an end tool working volume. The first imaging configuration may be fixed to the frame above a portion of the end tool working volume.

In various implementations, the robot system may be operated in either a robot position coordinates mode or a supplementary metrology position coordinates mode. The robot position coordinates mode may correspond to an independent and/or standard mode of operation for the robot (e.g., a mode in which the robot is operated independently, such as when a supplementary metrology position coordinates determination system is not active or is otherwise not provided). In the robot position coordinates mode, the robot movements and corresponding end tool position are controlled and determined with the level of accuracy defined as the robot accuracy (i.e., utilizing the position sensors included in the robot). Conversely, in the supplementary metrology position coordinates mode, metrology position coordinates may be determined that are indicative of the end tool position at an image acquisition time, with an accuracy level that is better than the robot accuracy (e.g., better than the accuracy of the position sensors included in the robot), at least for a vector component of the metrology position coordinates that is at least one of transverse or perpendicular to the scale imaging axis direction. In various implementations, determined position information (e.g., the determined metrology position coordinates that are indicative of the relative position, the determined metrology position coordinates of the end tool position and/or other related determined position information) may then be utilized for performing a designated function (e.g., as part of workpiece measurements, positioning control of the robot, etc.)

DETAILED DESCRIPTION

Figure 1:
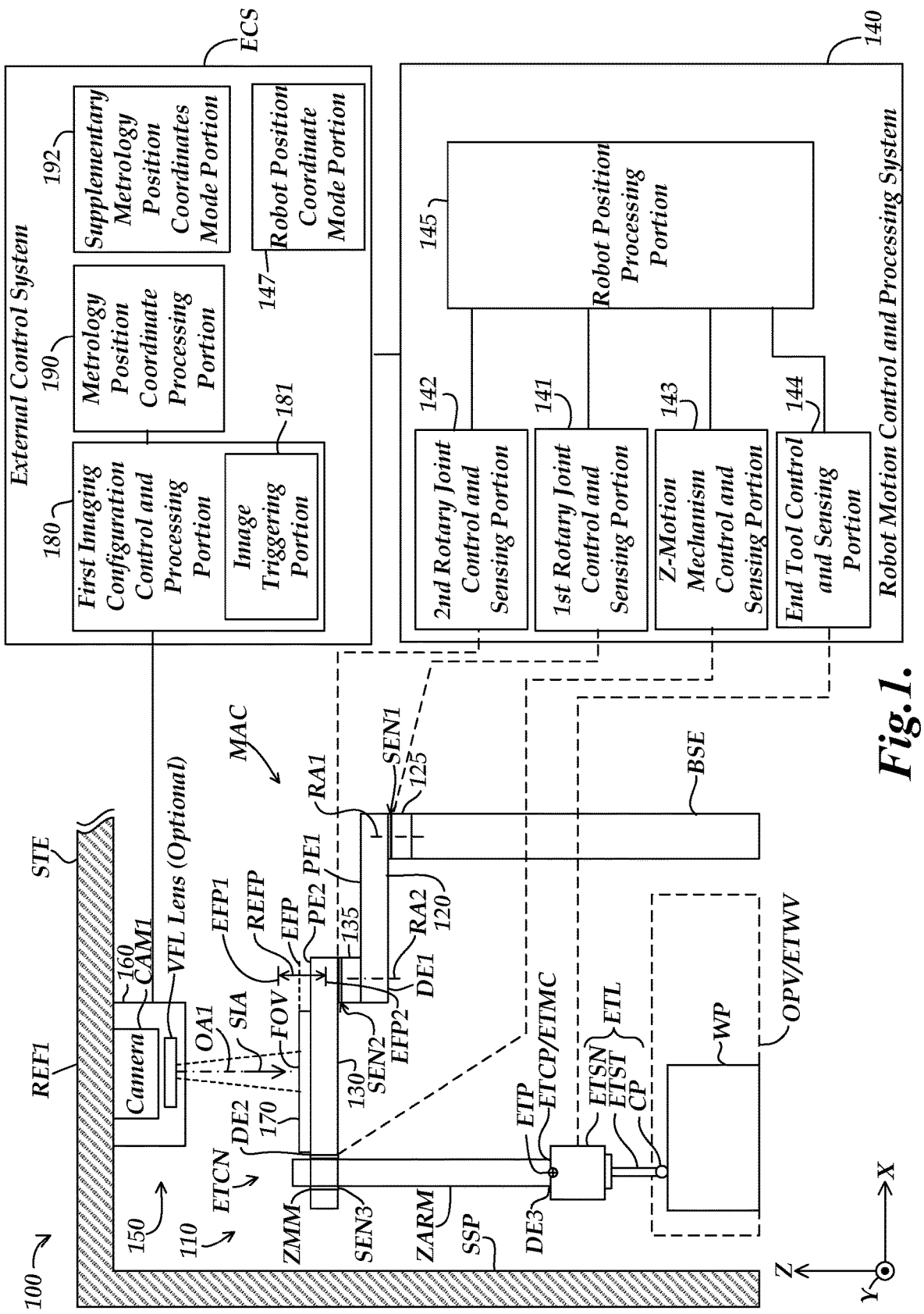
FIG. 1 is a block diagram of a first exemplary implementation of a robot system including an articulated robot and a supplementary metrology position coordinates determination system.

FIG. 1 is a block diagram of a first exemplary implementation of a robot system 100 including an articulated robot 110 and a supplementary metrology position coordinates determination system 150. The articulated robot 110 includes first and second arm portions 120 and 130, first and second rotary joints 125 and 135, position sensors SEN1 and SEN2, an end tool configuration ETCN, and a robot motion control and processing system 140. The first arm portion 120 is mounted to the first rotary joint 125 at a proximal end PE1 of the first arm portion 120. The first rotary joint 125 (e.g., located at an upper end of a supporting base portion BSE) has a rotary axis RA1 aligned along a z axis direction such that the first arm portion 120 moves about the first rotary joint 125 in an x-y plane that is perpendicular to the z axis. The second rotary joint 135 is located at a distal end DE1 of the first arm portion 120. The second rotary joint 135 has its rotary axis RA2 nominally aligned along the z axis direction. The second arm portion 130 is mounted to the second rotary joint 135 at a proximal end PE2 of the second arm portion 130, such that the second arm portion 130 moves about the second rotary joint 135 in an x-y plane that is nominally perpendicular to the z axis. In various implementations, the position sensors SEN1 and SEN2 (e.g., rotary encoders) may be utilized for determining the angular positions (i.e., in the x-y plane) of the first and second arm portions 120 and 130 about the first and second rotary joints 125 and 135, respectively.

In various implementations, the end tool configuration ETCN may include a Z-motion mechanism ZMM, a Z-arm portion ZARM, a position sensor SEN3 and an end tool coupling portion ETCP which couples to an end tool ETL. In various implementations, the end tool ETL may include an end tool sensing portion ETSN and an end tool stylus ETST with a contact point CP (e.g., for contacting a surface of a workpiece WP). The Z-motion mechanism ZMM is located proximate to the distal end DE2 of the second arm portion 130. The Z-motion mechanism ZMM (e.g., a linear actuator) is configured to move the Z-arm portion ZARM up and down in the z axis direction. In some implementations, the Z-arm portion ZARM may also be configured to rotate about an axis parallel to the z axis direction. In any case, the end tool ETL is coupled at the end tool coupling portion ETCP, and has a corresponding end tool position ETP with corresponding coordinates (e.g., x, y and z coordinates). In various implementations, the end tool position ETP may correspond to, or be proximate to, the distal end DE3 of the Z-arm portion ZARM (e.g., at or proximate to the end tool coupling portion ETCP).

The motion control system 140 is configured to control the end tool position ETP of the end tool ETL with a level of accuracy defined as a robot accuracy. More specifically, the motion control system 140 is generally configured to control the x and y coordinates of the end tool position ETP with the robot accuracy based at least in part on sensing and controlling the angular positions (i.e., in the x-y plane) of the first and second arm portions 120 and 130 about the first and second rotary joints 125 and 135, respectively, using the position sensors SEN1 and SEN2. In various implementations, the motion control and processing system 140 may include first and second rotary joint control and sensing portions 141 and 142 that may receive signals from the position sensors SEN1 and SEN2, respectively, for sensing the angular positions of the first and second arm portions 120 and 130, and/or may provide control signals (e.g., to motors, etc.) in the first and second rotary joints 125 and 135 for rotating the first and second arm portions 120 and 130.

In addition, the motion control system 140 is generally configured to control the z coordinate of the end tool position ETP with the robot accuracy based at least in part on sensing and controlling the linear position (i.e., along the z axis) of the Z-arm portion ZARM using the Z-motion mechanism ZMM and the position sensor SEN3. In various implementations, the motion control and processing system 140 may include a Z-motion mechanism control and sensing portion 143 that may receive signals from the position sensor SEN3 for sensing the linear position of the Z-arm portion ZARM, and/or may provide control signals to the Z-motion mechanism ZMM (e.g., a linear actuator) to control the z position of the Z-arm portion ZARM.

The motion control and processing system 140 may also receive signals from the end tool sensing portion ETSN. In various implementations, the end tool sensing portion ETSN may include circuitry and/or configurations related to the operations of the end tool ETL for sensing a workpiece WP. As will be described in more detail below, in various implementations the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN which may provide corresponding signals to the motion control and processing system 140. In various implementations, the motion control and processing system 140 may include an end tool control and sensing portion 144 that may provide control signals to and/or receiving sensing signals from the end tool sensing portion ETSN. In various implementations, the end tool control and sensing portion 144 and the end tool sensing portion ETSN may be merged and/or indistinguishable. In various implementations, the first and second rotary joint control and sensing portions 141 and 142, the Z-motion mechanism control and sensing portion 143, and the end tool control and sensing portion 144 may all provide outputs to and/or receive control signals from a robot position processing portion 145 which may control and/or determine the overall positioning of the articulated robot 110 and corresponding end tool position ETP as part of the robot motion control and processing system 140.

In various implementations, the supplementary metrology position coordinates determination system 150 may be included with or otherwise added to an articulated robot 110 (e.g., as part of a retrofit configuration for being added to an existing articulated robot 110, etc.) In general, the supplementary metrology position coordinates determination system 150 may be utilized to provide an improved level of accuracy for the determination of the end tool position ETP. More specifically, as will be described in more detail below, the supplementary metrology position coordinates determination system 150 may be utilized to determine a relative position that is indicative of the metrology position coordinates of the end tool position ETP, with an accuracy level that is better than the robot accuracy, at least for x and y metrology position coordinates in an x-y plane that is perpendicular to the z axis.

As illustrated in FIG. 1, the supplementary metrology position coordinates determination system 150 includes a first imaging configuration 160, an XY scale 170, an image triggering portion 181, and a metrology position coordinate processing portion 190. The first imaging configuration 160 is coupled to a stationary element STE. In various implementations, the stationary element STE may comprise a frame arranged above at least a portion of an operable work volume OPV of the articulated robot 110, and for which the first imaging configuration 160 is fixed to the frame above a portion of the operable work volume OPV. In various implementations, the stationary element STE may include one or more structural support elements SSP (e.g., extending from a floor, ceiling, etc.) for maintaining the stationary element STE in a fixed location (e.g., with a fixed position and/or orientation) relative to the articulated robot 110.

The first imaging configuration 160 includes a first camera CAM1 and has an optical axis OA1 that is nominally aligned parallel to the z axis. The first imaging configuration 160 has an effective focus range REFP along its optical axis OA1. In various implementations, the range REFP may be bound by first and second effective focus positions EFP1 and EFP2, as will be described in more detail below. At a given time, the first imaging configuration 160 has an effective focus position EFP that falls within the range REFP. In an implementation where a variable focal length (VFL) lens is used, the range REFP may correspond to the range of focus of the VFL lens.

In various implementations, a VFL lens that is utilized may be a tunable acoustic gradient index of refraction (TAG) lens. With respect to the general operations of such a TAG lens, in various implementations a lens controller (e.g., as included in the first imaging configuration control and image processing portion 180) may rapidly adjust or modulate the optical power of the TAG lens periodically, to achieve a high-speed TAG lens capable of a periodic modulation (i.e., at a TAG lens resonant frequency) of 250 kHz, or 70 kHz, or 30 kHz, or the like. In such a configuration, the effective focus position EFP of the first imaging configuration 160 may be (rapidly) moved within the range REFP (e.g., an autofocus search range). The effective focus position EFP1 (or EFPmax) may correspond to a maximum optical power of the TAG lens, and the effective focus position EFP2 (or EFPmin) may correspond to a maximum negative optical power of the TAG lens. In various implementations, the middle of the range REFP may be designated as EFPnom, and may correspond to zero optical power of the TAG lens.

In various implementations, such a VFL lens (e.g., a TAG lens) and a corresponding range REFP may be advantageously chosen such that the configuration limits or eliminates the need for macroscopic mechanical adjustments of the first imaging configuration 160 and/or adjustment of distances between components in order to change the effective focus position EFP. For example, in an implementation where an unknown amount of tilt or "sag" at the distal end DE2 of the second arm portion 130 may occur (e.g., due to the weight and/or specific orientations of the first and second arm portions 120 and 130, etc.), the precise focus distance from the first imaging configuration 160 to the XY scale 170 may be unknown and/or may vary with different orientations of the arms, etc. In such a configuration, it may be desirable for a VFL lens to be utilized that can scan or otherwise adjust the effective focus position EFP to determine and accurately focus at the XY scale 170.

In various implementations, the XY scale 170 comprises a nominally planar substrate SUB arranged nominally perpendicular to the z axis and a plurality of respective imageable features that are distributed on the substrate SUB. The respective imageable features are located at respective known x and y scale coordinates on the XY scale 170. In various implementations, the XY scale 170 may be an incremental or absolute scale, as will be described in more detail below with respect to FIGS. 4 and 5.

In various implementations, the image triggering portion 181 and/or the metrology position coordinate processing portion 190 may be included as part of an external control system ECS (e.g., as part of an external computer, etc.) The image triggering portion 181 may be included as part of a first imaging configuration control and processing portion 180. In various implementations, the image triggering portion 181 is configured to input at least one input signal that is related to the end tool position ETP and to determine the timing of a first imaging trigger signal based on the at least one input signal, and to output the first imaging trigger signal to the first imaging configuration 160. In various implementations, the first imaging configuration 160 is configured to acquire a digital image of the XY scale 170 at an image acquisition time in response to receiving the first imaging trigger signal. In various implementations, the metrology position coordinate processing portion 190 is configured to input the acquired image and to identify at least one respective imageable feature included in the acquired image of the XY scale 170 and the related respective known XY scale coordinate location. In various implementations, the external control system ECS may also include a standard robot position coordinates mode portion 147 and a supplementary metrology position coordinates mode portion 192, for implementing corresponding modes, as will be described in more detail below.

In various implementations, the first imaging configuration 160 may include a component (e.g., a subcircuit, routine, etc.) that activates an image integration of the camera CAM1 periodically (e.g., at a set timing interval) for which the first imaging trigger signal may activate a strobe light timing or other mechanism to effectively freeze motion and correspondingly determine an exposure within the integration period. In such implementations, if no first imaging trigger signal is received during the integration period, a resulting image may be discarded, wherein if a first imaging trigger signal is received during the integration period, the resulting image may be saved and/or otherwise processed/analyzed to determine a relative position, as will be described in more detail below.

In various implementations, different types of end tools ETL may provide different types of outputs that may be utilized with respect to the image triggering portion 181. For example, in an implementation where the end tool ETL is a touch probe that is used for measuring a workpiece and that outputs a touch signal when it touches the workpiece, the image triggering portion 181 may be configured to input that touch signal, or a signal derived therefrom, as the at least one input signal that the timing of a first imaging trigger signal is determined based on. As another example, in an implementation where the end tool ETL is a scanning probe that is used for measuring a workpiece and that provides respective workpiece measurement sample data corresponding to a respective sample timing signal, the image triggering portion 181 may be configured to input that respective sample timing signal, or a signal derived therefrom, as the at least one input signal. As another example, in an implementation where the end tool ETL is a camera that is used to provide a respective workpiece measurement image corresponding to a respective workpiece image acquisition signal, the image triggering portion 181 may be configured to input that workpiece image acquisition signal, or a signal derived therefrom, as the at least one input signal.

In the example implementation of FIG. 1, the supplementary metrology position coordinates determination system 150 is configured with the XY scale 170 coupled to the second arm portion 130 proximate to the distal end DE2 of the second arm portion 130 and the first imaging configuration 160 coupled to a stationary element STE (e.g., a frame arranged above the articulated robot 110) and defining a first reference position REF1. In an alternative implementation (e.g., as will be described in more detail below with respect to FIG. 3), a supplementary metrology position coordinates determination system may be configured with the first imaging configuration 160 coupled to the second arm portion 130 proximate to the distal end DE2 of the second arm portion 130 and the XY scale 170 coupled to a stationary element STE and defining a first reference position REF1.

In either case, as will be described in more detail below, the location of the XY scale 170 along the z axis is within the range of focus of the first imaging configuration 160 (e.g., for which the focus position may be adjusted by a VFL lens or otherwise), and the supplementary metrology position coordinates determination system 150 is configured such that the metrology position coordinate processing portion 190 is operable to determine a relative position (e.g., including x and y coordinates) between the movable one of the XY scale 170 or the first imaging configuration 160 and the first reference position REF1 with an accuracy level that is better than the robot accuracy, based on determining an image position of the identified at least one respective imageable feature in the acquired image. The determined relative position is indicative of the metrology position coordinates of the end tool position ETP at the image acquisition time, with an accuracy level that is better than the robot accuracy, at least for x and y metrology position coordinates in an x-y plane that is perpendicular to the z axis. In various implementations, the supplementary metrology position coordinates determination system 150 may be configured to determine the metrology position coordinates of the end tool position ETP at the image acquisition time, based on the determined relative position and a known coordinate position offset (x and y coordinate offset) between the end tool position ETP and the movable one of the XY scale 170 or the first imaging configuration 160. It will be appreciated that such a system may have certain advantages over various alternative systems. For example, in various implementations a system such as that disclosed herein may be smaller and/or less expensive than alternative systems utilizing technologies such as laser trackers or photogrammetry for tracking robot movement/positions, and may also have higher accuracy in some implementations. The disclosed system also does not take up or obscure any part of the operable work volume OPV, such as alternative systems that may include a scale or fiducial on the ground or stage, or otherwise in the same area (e.g., operable work volume) where workpieces may otherwise be worked on and/or inspected, etc.

Figure 2:
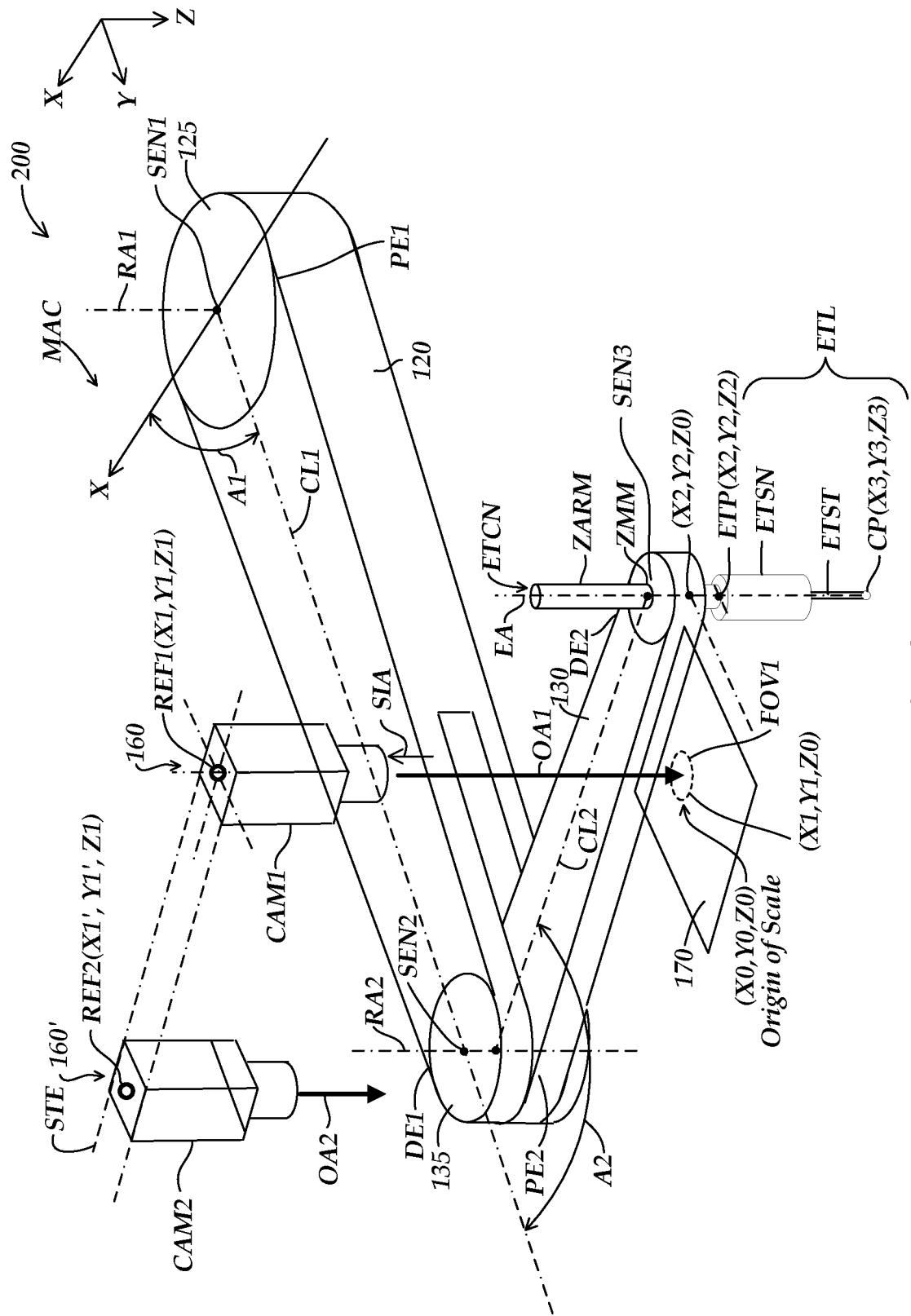
FIG. 2 is an isometric diagram of a second exemplary implementation of a robot system similar to the robot system of FIG. 1, in which a first imaging configuration is coupled to a stationary element.

FIG. 2 is an isometric diagram of a second exemplary implementation of a robot system 200 similar to the robot system 100 of FIG. 1 in which the first imaging configuration 160 is coupled to a stationary element STE (e.g., the stationary element STE of FIG. 1). It will be appreciated that certain numbered components (e.g., 1XX or 2XX) of FIG. 2 may correspond to and/or have similar operations as identically or similarly numbered counterpart components (e.g., 1XX) of FIG. 1, and may be understood to be similar or identical thereto and may otherwise be understood by analogy thereto and as otherwise described below. This numbering scheme to indicate elements having analogous and/or identical design and/or function is also applied to the following FIGS. 3-5.

In the configuration of FIG. 2 (i.e., similar to the configuration of FIG. 1), the XY scale 170 is coupled to the second arm portion 130 proximate to the distal end DE2 of the second arm portion 130. In various implementations, as described above with respect to FIG. 1, the stationary element STE that the first imaging configuration 160 is coupled to may comprise a frame arranged above the articulated robot 110. In various implementations, different reference axes and lines may be designated for referencing certain movements, coordinates and angles of the components of the articulated robot 110. For example, the first and second arm portions 120 and 130 may each have designated horizontal center lines CL1 and CL2, respectively, passing down the centers of the respective arm portions. An angle A1 may be designated as occurring between the center line CL1 of the first arm portion 120 and an x-z plane (e.g., in accordance with an amount of rotation of the first rotary joint 125 about the first rotary axis RA1). An angle A2 may be designated as occurring between the horizontal center line CL1 of the first arm portion 120 and the horizontal center line CL2 of the second arm portion 130 (e.g., in accordance with an amount of rotation of the second rotary joint 135 about the second rotary axis RA2).

In various implementations, the end tool configuration ETCN may be coupled to the second arm portion 130 proximate to the distal end DE2 of the second arm portion 130 and may be designated as having an end tool axis EA of the end tool ETL that nominally intersects the center line CL2 of the second arm portion 130, and for which the end tool axis EA may generally be assumed to be parallel to the rotary axis RA2 and the z axis. In various implementations, the end tool axis EA passes through the end tool position ETP, and has a known coordinate position offset (i.e., for x and y coordinates) from the XY scale 170. Correspondingly, there may be a known coordinate position offset between the end tool position ETP and the XY scale 170. For example, the XY scale 170 may have a designated reference point (e.g., at a center or edge of the XY scale 170) which has a known coordinate position offset (e.g., a known distance) in an x-y plane from the end tool axis EA and correspondingly from the end tool position ETP. In various implementations, such a known coordinate position offset may be expressed in terms of a known x offset and a known y offset.

In various implementations, the known coordinate position offset between the end tool position ETP and the XY scale 170 may be utilized as part of the process for determining the metrology position coordinates of the end tool position ETP. More specifically, as noted above, the supplementary metrology position coordinates determination system 150 may be configured such that the metrology position coordinate processing portion 190 operates to determine a relative position between the XY scale 170 and the first reference position REF1 (i.e., as defined by the stationary first imaging configuration 160), based on determining an image position of the identified at least one respective imageable feature (i.e., of the XY scale 170) in the acquired image. The supplementary metrology position coordinates determination system 150 may further be configured to determine the metrology position coordinates of the end tool position ETP, based on the determined relative position and a known coordinate position offset between the end tool position ETP and the movable XY scale 170. In one specific example implementation, the known coordinate position offset (e.g., expressed in terms of a known x offset and a known y offset) may be added to or otherwise combined with the determined relative position in order to determine the metrology position coordinates of the end tool position ETP.

As one specific example position coordinate configuration, the XY scale 170 may be designated as having a reference position (e.g., an origin location) at X0, Y0, Z0 (e.g., which for an origin location may have values of 0,0,0). In such a configuration, the reference location REF1 (i.e., as defined by the stationary first imaging configuration 160) may be at relative coordinates of X1, Y1, Z1, and a center of a corresponding field of view FOV1 (e.g., corresponding to an acquired image) may be at relative coordinates of X1, Y1, Z0. A location of the end tool axis EA in an x-y plane extending from the XY scale 170 may be designated as having relative coordinates of X2, Y2, Z0. The end tool position ETP may be designated as having coordinates of X2, Y2, Z2. In various implementations, the end tool ETL may have a contact point CP (e.g., at the end of an end tool stylus ETST for contacting a workpiece) which may be designated as having coordinates X3, Y3, Z3. In an implementation where the contact point CP of the end tool ETL does not vary in the x or y directions relative to the rest of the end tool, the X3 and Y3 coordinates may be equal to the X2 and Y2 coordinates, respectively.

In one specific example implementation, an acquired image may be analyzed by the metrology position coordinate processing portion 190 to determine a relative position (e.g., to determine the X1, Y1 coordinates corresponding to the center of the field of view FOV1 of the stationary first imaging configuration 160). Such a determination may be made in accordance with standard camera/scale image processing techniques (e.g., for determining a location of camera relative to a scale). Various examples of such techniques are described in U.S. Pat. Nos. 6,781,694; 6,937,349; 5,798,947; 6,222,940; and 6,640,008, each of which is hereby incorporated herein by reference in its entirety. In various implementations, such techniques may be utilized to determine the location of a field of view (e.g., as corresponding to a position of a camera) within a scale range (e.g., within the XY scale 170), as will be described in more detail below with respect to FIGS. 4 and 5. In various implementations, such a determination may include identifying at least one respective imageable feature included in the acquired image of the XY scale 170 and the related respective known XY scale coordinate location. Such a determination may correspond to determining a relative position between the XY scale 170 and the first reference position REF1 (i.e., as defined by the stationary first imaging configuration 160). The relative X2, Y2 coordinates (i.e., of the end tool position ETP) may then be determined according to the known coordinate position offset between the end tool position ETP and the XY scale 170 (e.g., adding the x and y position offset values to X1 and Y1 in order to determine X2 and Y2).

In various implementations, the supplementary metrology position coordinates determination system 150 may further include one or more additional imaging configurations. For example, as illustrated in FIG. 2, the metrology position coordinates determination system 150 may include a second imaging configuration 160' having a second camera CAM2 and an optical axis OA2 that is nominally aligned parallel to the z axis. The second imaging configuration 160' may define a second reference position REF2 (e.g., having relative coordinates of X1', Y1' and Z1). The second imaging configuration 160' may have an effective focus range REFP along its optical axis OA2. In such a configuration, the image triggering portion 181 may be further configured to input at least one input signal that is related to the end tool position ETP and determine the timing of a second imaging trigger signal based on the at least one input signal and output the second imaging trigger signal to the second imaging configuration 160'. In various implementations, the second imaging configuration 160' may be configured to acquire a digital image of the XY scale 170 at an image acquisition time in response to receiving the second imaging trigger signal. The metrology position coordinate processing portion 190 may be further configured to input the acquired image and identify at least one respective imageable feature included in the acquired image of the XY scale 170 and the related respective known XY scale coordinate location.

In various implementations, the metrology position coordinate processing portion 190 may be operable to determine a relative position between the XY scale 170 and the second reference position REF2 with an accuracy level that is better than the robot accuracy, based on determining an image position of the identified at least one respective imageable feature in the acquired image. In such an implementation, the determined relative position is indicative of the metrology position coordinates of the end tool position ETP at the image acquisition time, with an accuracy level that is better than the robot accuracy, at least for x and y metrology position coordinates in an x-y plane that is perpendicular to the z axis.

In various implementations, the at least one input signal that is input to the image triggering portion 181 includes one or more signals derived from the motion control system 140. In such configurations, the image triggering portion 181 may be configured to determine whether the XY scale 170 is aligned with the first or second imaging configuration 160 or 160' based on the one or more signals derived from the motion control system 140. If the XY scale 170 is determined to be aligned with the first imaging configuration 160 (e.g., such that a sufficient portion of the XY scale 170 is imaged by the first imaging configuration 160) the image triggering portion 181 is configured to output the first imaging trigger signal. Conversely, if the XY scale 170 is determined to be aligned with the second imaging configuration 160' (e.g., such that a sufficient portion of the XY scale 170 is imaged by the second imaging configuration 160') the image triggering portion 181 is configured to output the second imaging trigger signal.

Figure 3:
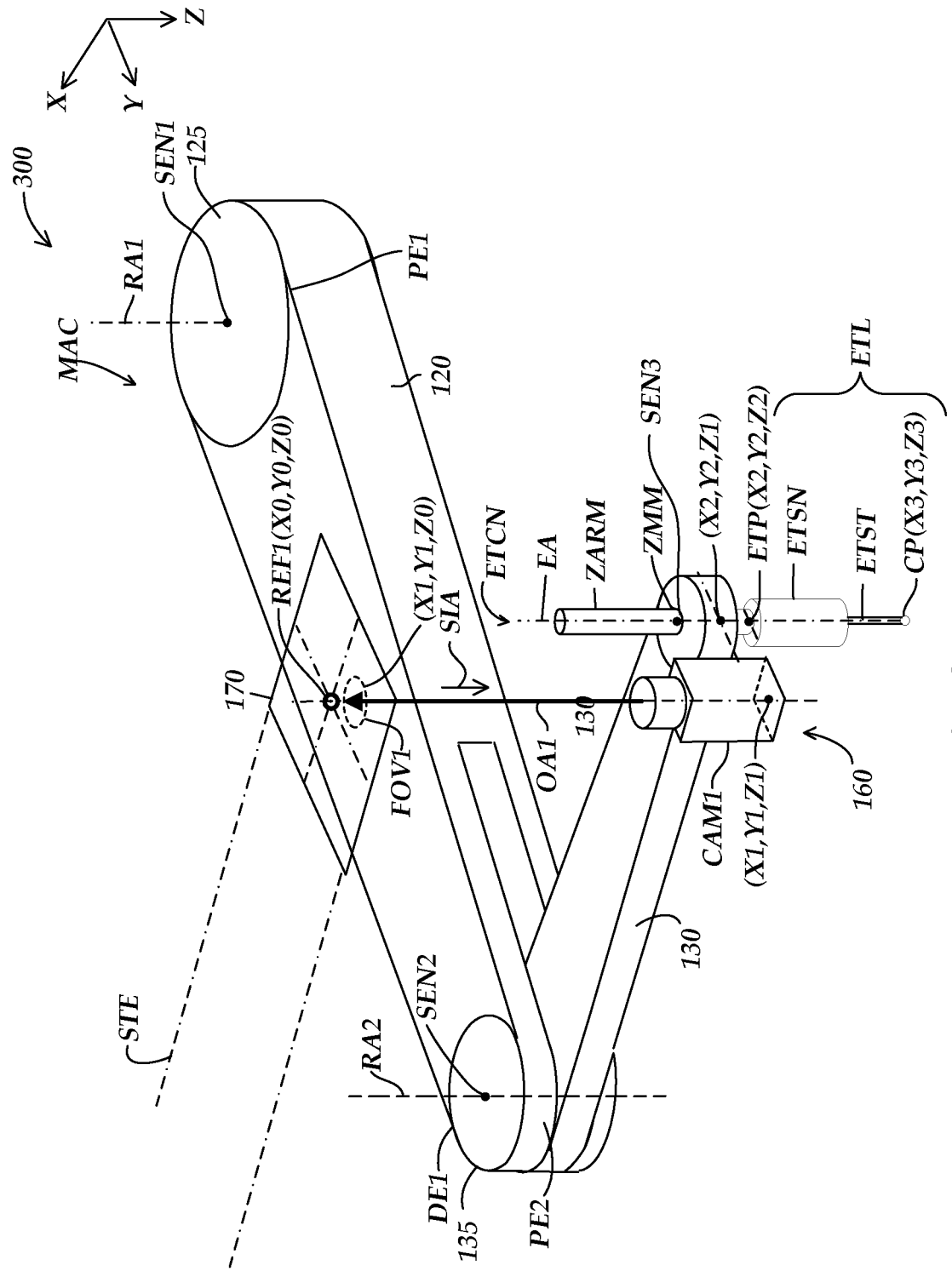
FIG. 3 is an isometric diagram of a third exemplary implementation of a robot system in which an XY scale is coupled to a stationary element.

FIG. 3 is an isometric diagram of a third exemplary implementation of a robot system 300 in which the XY scale 170 is coupled to the stationary element STE and defines the first reference position REF1. In the configuration of FIG. 3, the first imaging configuration 160 is coupled to the second arm portion 130 proximate to the distal end DE2 of the second arm portion 130. In various implementations, the end tool axis EA has a known coordinate position offset (i.e., for x and y coordinates) from the first imaging configuration 160. Correspondingly, there may be a known coordinate position offset between the end tool position ETP and the first imaging configuration 160. For example, the first imaging configuration 160 may have a designated reference point (e.g., at a center of the first imaging configuration 160) which has a known coordinate position offset (e.g., a known distance) in an x-y plane from the end tool axis EA and correspondingly from the end tool position ETP. In various implementations, such a known coordinate position offset may be expressed in terms of a known x offset and a known y offset.

In various implementations, the known coordinate position offset between the end tool position ETP and the first imaging configuration 160 may be utilized as part of the process for determining the metrology position coordinates of the end tool position ETP. More specifically, as noted above, the supplementary metrology position coordinates determination system 150 may be configured such that the metrology position coordinate processing portion 190 operates to determine a relative position between the first imaging configuration 160 and the first reference position REF1 (i.e., as defined by the stationary XY scale 170), based on determining an image position of an identified at least one respective imageable feature (i.e., of the XY scale 170) in the acquired image. The supplementary metrology position coordinates determination system 150 may further be configured to determine the metrology position coordinates of the end tool position ETP, based on the determined relative position and a known coordinate position offset between the end tool position ETP and the movable first imaging configuration 160. In one specific example implementation, the known coordinate position offset (e.g., expressed in terms of a known x offset and a known y offset) may be added to or otherwise combined with the determined relative position in order to determine the metrology position coordinates of the end tool position ETP.

As one specific example position coordinate configuration, the XY scale 170 may be designated as having a reference location REF1 (e.g., an origin location) at X0, Y0, Z0 (e.g., which for an origin location may have values of 0,0,0). The first imaging configuration 160 may be at a location with relative coordinates of X1, Y1, Z1 and a center of a corresponding field of view FOV1 (e.g., as captured in an acquired image) may be at relative coordinates of X1, Y1, Z0. A location of the end tool axis EA in an x-y plane extending from the first imaging configuration 160 may be designated as having relative coordinates of X2, Y2, Z1. The end tool position ETP may be designated as having coordinates of X2, Y2, Z2. In various implementations, the end tool ETL may have a contact point CP (e.g., at the end of an end tool stylus ETST for contacting a workpiece) which may be designated as having coordinates X3, Y3, Z3. In an implementation where the contact point CP of the end tool ETL does not vary in the x or y directions relative to the rest of the end tool, the X3 and Y3 coordinates may be equal to the X2 and Y2 coordinates, respectively.

In various implementations, the robot system 300 of FIG. 3 may have certain different design considerations and aspects as compared the robot system 200 of FIG. 2 (e.g., related to a possible vertical displacement or sag at the distal ends DE1 and DE2 of the first and second arm portions 120 and 130, respectively). In an implementation where such displacement or sag may occur (e.g., due to the weight and/or different orientations of the arm portions, imaging configuration 160, etc.), a particularly undesirable effect may be experienced in the robot system 300 of FIG. 3 with respect to the field of view FOV of the first imaging configuration 160 being correspondingly shifted. More specifically, such vertical displacement or sag may cause a relatively significant shift/change in the location of the field of view FOV on the XY scale 170 (i.e., as attached to the stationary element STE), which may result in a relatively significant error in the determined relative position and the corresponding metrology position coordinates of the end tool position ETP. Due to such issues, in certain implementations the configuration of the robot system 200 of FIG. 2 may be considered to have corresponding advantages over the robot system 300 of FIG. 3.

Figure 4:
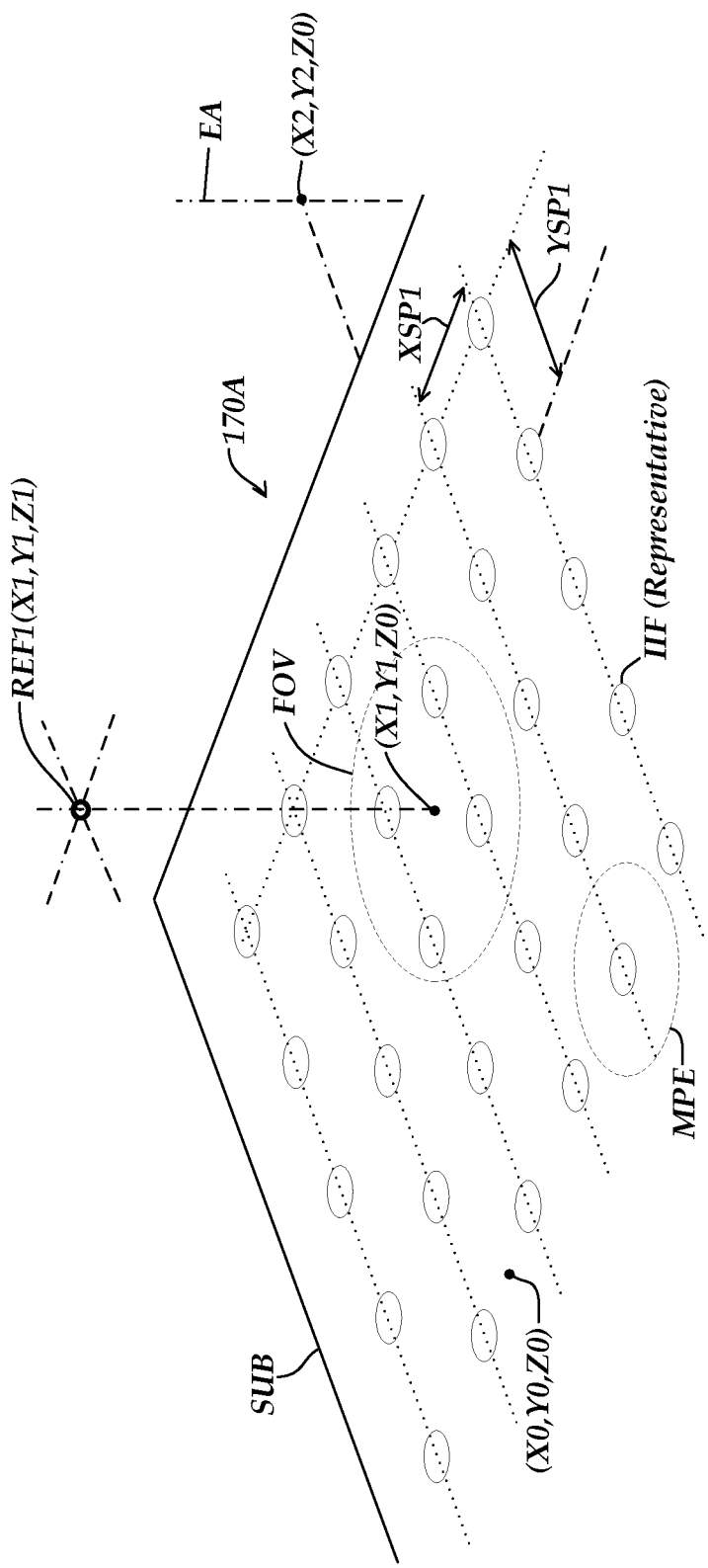
FIG. 4 is an isometric diagram of an exemplary implementation of an incremental XY scale.

FIG. 4 is an isometric diagram of an exemplary implementation of an incremental XY scale 170A. As illustrated in FIG. 4, the incremental XY scale 170A includes an array of evenly spaced incremental imageable features IIF. In various implementations, the incremental XY scale 170A may have a periodicity that is smaller than 100 microns (e.g., for which periodic spacings XSP1 and YSP1 between the incremental imageable features IIF along the respective x and y axes may each be less than 100 microns). In various implementations, the position information that is determined utilizing the incremental XY scale 170A may have an accuracy of at least 10 microns. In contrast to a robot accuracy that may be approximately 100 microns in certain implementations, the accuracy determined utilizing such an XY scale 170A may be at least 10× that of the robot accuracy. In one specific example implementation, the incremental XY scale 170A may have an even higher periodicity of approximately 10 microns, for which, if the magnification of the first imaging configuration 160 is approximately 1× and interpolation is performed by a factor of 10×, an approximately 1 micron accuracy may be achieved. Such a configuration would have an approximately 100× improvement in accuracy over a robot accuracy of approximately 100 microns.

In various implementations, a location of a field of view FOV of the first imaging configuration 160 within the incremental XY scale 170A may provide an indication of a relative position between the XY scale 170A and the first reference position REF1. In various implementations, the first imaging configuration 160 may be utilized in combination with the incremental XY scale 170A as part of a camera/scale image processing configuration. For example, the metrology position coordinate processing portion 190 may determine a relative incremental position between the XY scale 170A and the first reference position REF1 based on the location of the field of view FOV within the incremental XY scale 170A, as indicated by the portion of the XY scale 170A in the acquired image, and as is known in the art for camera/scale image processing techniques (e.g., as described in the previously incorporated references). In various implementations, the incremental XY scale 170A may be of various sizes relative to the field of view FOV (e.g., the incremental XY scale 170A may be at least 4×, 10×, 20×, etc. larger than the field of view FOV).

In various implementations, the incremental position indicated by the XY scale 170A may be combined with position information from the articulated robot 110 to determine a relatively precise and/or absolute position. For example, the sensors SEN1 and SEN2 (e.g., rotary encoders) of the articulated robot 110 may indicate the end tool position ETP with the robot accuracy, for which the incremental position indicated by the XY scale 170A may be utilized to further refine the determined end tool position ETP to have an accuracy that is better than the robot accuracy. In one such configuration, the metrology position coordinate processing portion 190 may be configured to identify one or more respective imageable features IIF included in the acquired image of the XY scale 170A based on the image positions of the one or more imageable features IFF in the acquired image and based on articulated robot position data derived from the motion control system 140 corresponding to the image acquisition time.

In such configurations, the respective imageable features IFF of the XY scale 170A may comprise a set of similar imageable features IFF that are distributed on the substrate such that they are spaced apart from one another at regular intervals by a distance that is more than a maximum position error that is allowed within the robot accuracy. As illustrated in FIG. 4, the imageable features IFF are spaced apart (e.g., at spacings XSP1 and YSP1) by more than a maximum position error MPE as represented by a circle surrounding a representative imageable feature IFF. It will be appreciated that in such a configuration, the robot accuracy for the position determination is sufficient to determine the location with an accuracy that is greater than the spacing between the imageable features IFF. More specifically, in various implementations, a single imageable feature IFF on the XY scale 170A (i.e., wherein the imageable features are all at known x and y metrology position coordinates on the XY scale 170A according to the even spacings across the scale) may thus be identified by the articulated robot position data with sufficient accuracy so that no two imageable features IFF may be confused with one another. In such a configuration, the location of single imageable feature IFF in the acquired image may then be utilized to further refine the end tool position ETP to have an accuracy that is better than the robot accuracy, at least for x and y metrology position coordinates of the end tool position ETP in an x-y plane that is perpendicular to the z axis.

As described above with respect to FIG. 2, in one specific example implementation, the XY scale 170A may be designated as having a reference position (e.g., an origin location) at X0, Y0, Z0 (e.g., which for an origin location may have values of 0,0,0). In such a configuration, the reference location REF1 (i.e., as defined by the stationary first imaging configuration 160) may be at relative coordinates of X1, Y1, Z1, and a center of a corresponding field of view FOV (e.g., as captured in an acquired image) may be at relative coordinates of X1, Y1, Z0. A location of the end tool axis EA in an x-y plane extending from the XY scale 170 may be designated as having relative coordinates of X2, Y2, Z0. The end tool position ETP may be designated as having coordinates of X2, Y2, Z2.

In operation, an acquired image may be analyzed by the metrology position coordinate processing portion 190 to determine the X1, Y1 coordinates corresponding to the center of the field of view FOV1 of the stationary first imaging configuration 160. In various implementations, such a determination may be made in accordance with standard camera/scale image processing techniques, for determining a location of a field of view (e.g., corresponding to a location of a camera) within a scale range (e.g., within the XY scale 170A). It will be appreciated that in accordance with standard camera/scale image processing techniques, the reference position/origin location X0, Y0, Z0 is not required to be in the field of view FOV for such a determination to be made (i.e., the relative position may be determined from the scale information at any location along the XY scale 170A, as provided in part by the scale elements comprising the evenly spaced incremental imageable features IIF). In various implementations, such a determination may include identifying at least one respective imageable feature included in the acquired image of the XY scale 170 and the related respective known XY scale coordinate location. Such a determination may correspond to determining a relative position between the XY scale 170 and the first reference position REF1 (i.e., as defined by the stationary first imaging configuration 160). The relative X2, Y2 coordinates (i.e., of the end tool position ETP) may then be determined according to the known coordinate position offset between the end tool position ETP and the XY scale 170 (e.g., adding the x and y position offset values to X1 and Y1 in order to determine X2 and Y2).

A specific illustrative example of combining the position information from the articulated robot 110 with the incremental position information indicated by the XY scale 170A to determine a relatively precise and/or absolute position is as follows. As illustrated in FIG. 4, the acquired image may indicate that the center of the field of view FOV is in the middle of four incremental imageable features IIF, but may not indicate which specific four incremental imageable features IIF of the XY scale 170 are included in the image. The position information from the articulated robot 110 may be accurate enough to provide such information, for which the specific four incremental imageable features IIF of the XY scale 170A may be identified (e.g., based in part on the principles noted above by which the imageable features IFF are spaced apart by more than a maximum position error as represented by a representative circular area MPE so that each imageable feature IFF may be uniquely identified). The acquired image may then be analyzed by the metrology position coordinate processing portion 190 to determine precisely where the center of the field of view (i.e., at the coordinates X1, Y1, Z0) occurs within that section of the XY scale (i.e., which includes the specific four incremental imageable features IIF). The process may then continue as indicated above (e.g., for correspondingly determining the X2 and Y2 coordinates of the end tool position ETP).

Figure 5:
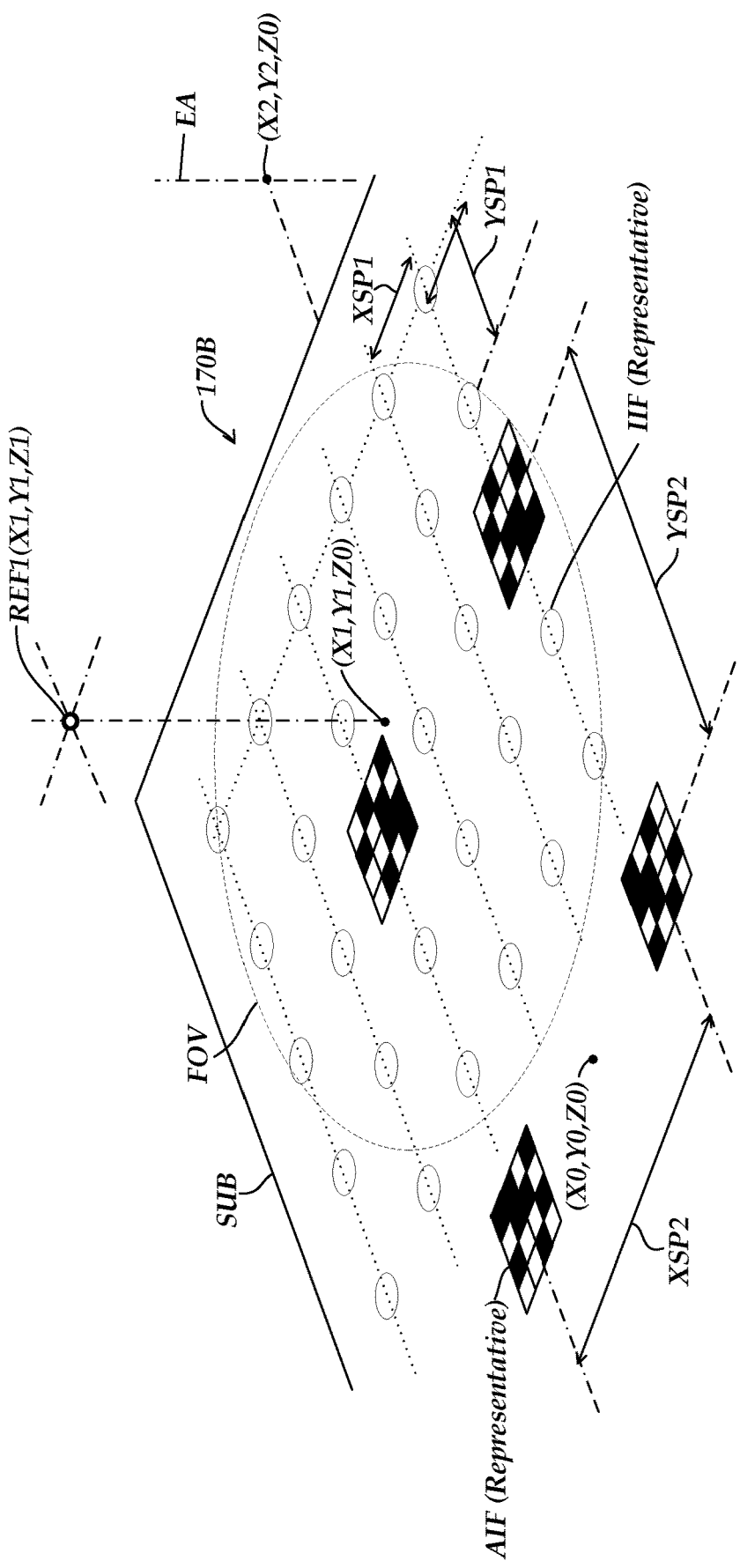
FIG. 5 is an isometric diagram of an exemplary implementation of an absolute XY scale.

FIG. 5 is an isometric diagram of an exemplary implementation of an absolute XY scale 170B. In the example of FIG. 5, similar to the incremental XY scale 170A, the absolute XY scale 170B includes an array of evenly spaced incremental imageable features IIF, and also includes a set of absolute imageable features AIF having unique identifiable patterns (e.g., a 16-bit pattern). In operation, a location of a field of view FOV of the first imaging configuration 160 within the absolute XY scale 170B (i.e., as included in a captured image) provides an indication of an absolute position between the XY scale 170B and the first reference position REF1. In the implementation of FIG. 5, the set of absolute imageable features AIF are distributed on the substrate SUB such that they are spaced apart (e.g., at spacings XSP2 and YSP2) by less than a distance corresponding to a distance across a field of view FOV of the first imaging configuration 160 (i.e., so that at least one absolute imageable feature AIF will always be included in a field of view). In operation, the metrology position coordinate processing portion 190 is configured to identify at least one respective absolute imageable feature AIF included in the acquired image of the XY scale 170B based on the unique identifiable pattern of the respective absolute imageable feature AIF. It will be appreciated that such implementations are able to independently determine an absolute position that is indicative of the end tool position ETP with an accuracy that is better than the robot accuracy, at least for x and y metrology position coordinates of the end tool position ETP in an x-y plane that is perpendicular to the z axis (e.g., and which, in contrast to the incremental XY scale 170B, may not require combining with position information from the articulated robot 110 to determine the absolute position).

A specific illustrative example of utilizing the absolute imageable features AIF to determine a relatively precise and absolute position is as follows. As illustrated in FIG. 5, the acquired image may indicate that the center of the field of view FOV is in the middle of a number of incremental imageable features IIF. The position information from the included two absolute imageable features AIF indicates which section of the XY scale 170B the image includes, for which the included incremental imageable features IIF of the XY scale 170 may also be identified. The acquired image may, accordingly, be analyzed by the metrology position coordinate processing portion 190 to determine precisely where the center of the field of view (i.e., at the coordinates X1, Y1, Z0) occurs within that section of the XY scale (i.e., which includes the two absolute imageable features and the incremental imageable features IIF). The process may then continue as indicated above (e.g., for correspondingly determining the X2 and Y2 coordinates of the end tool position ETP).

Figure 6A:
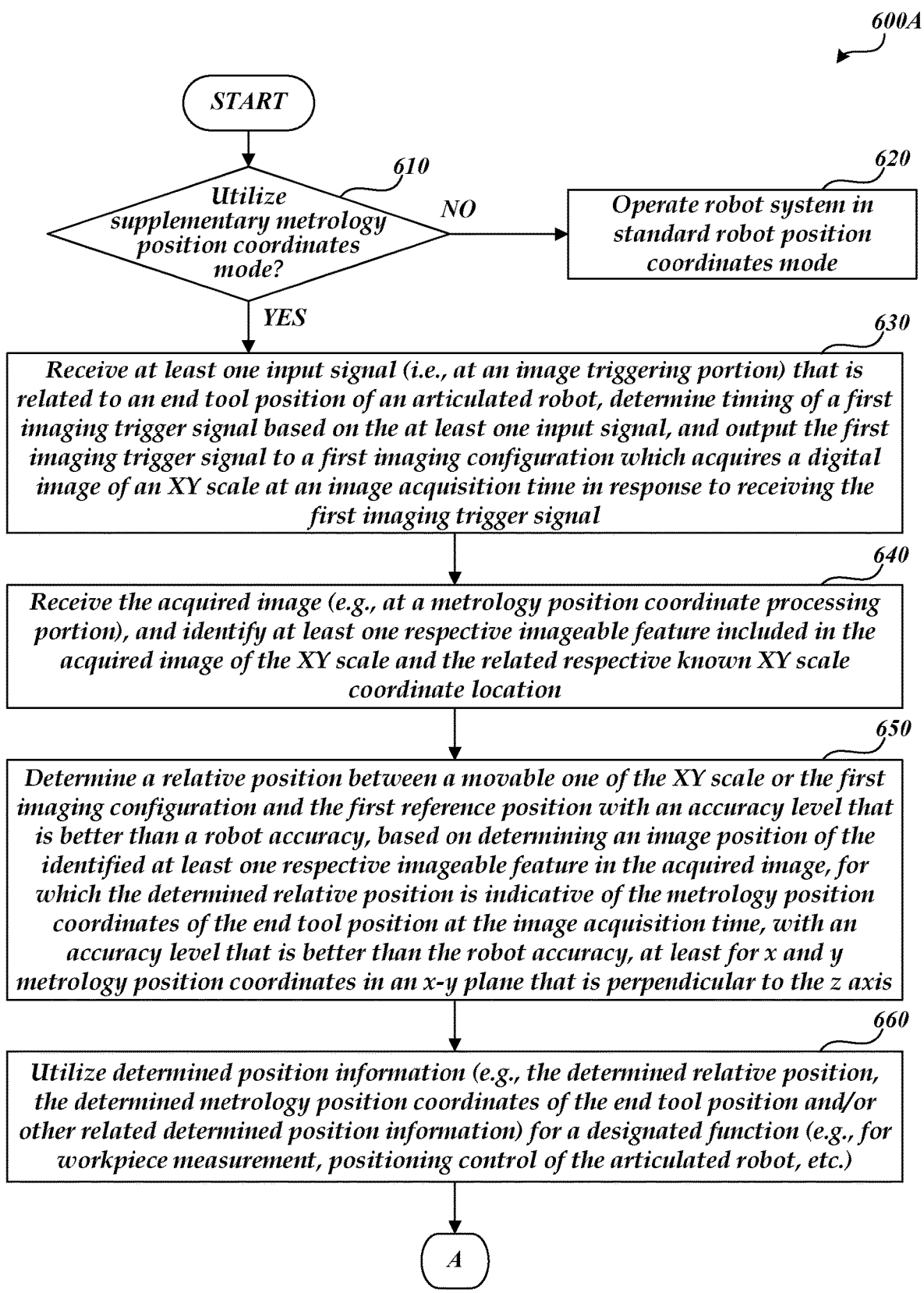
FIGS. 6A and 6B are flow diagrams illustrating first exemplary implementations of routines for operating a robot system including an articulated robot and a supplementary metrology position coordinates determination system.
Figure 6B:
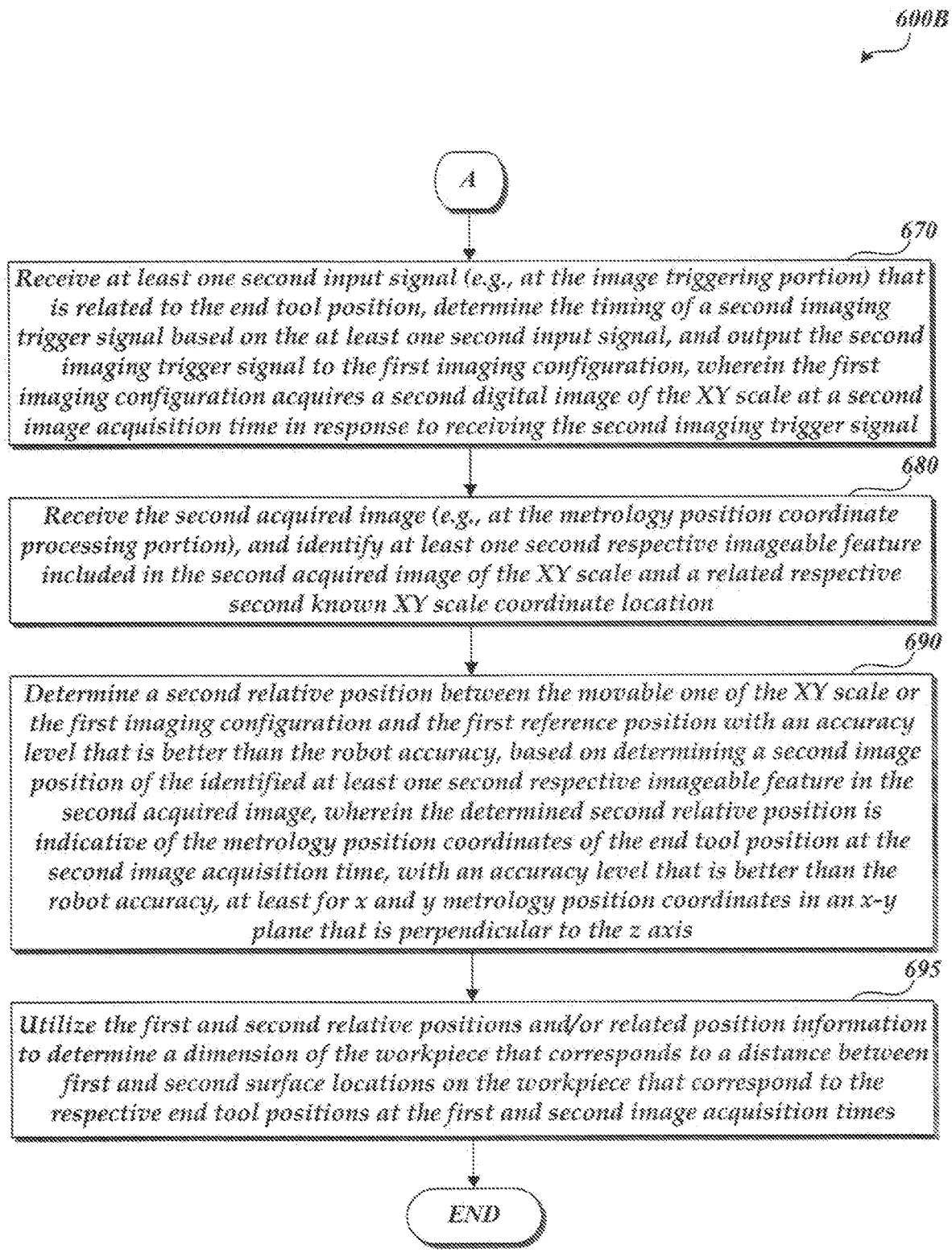

FIGS. 6A and 6B are flow diagrams illustrating exemplary implementations of routines 600A and 600B for operating a robot system including an articulated robot and a supplementary metrology position coordinates determination system. As shown in FIG. 6A, at a decision block 610, a determination is made as to whether the robot system is to be operated in a supplementary metrology position coordinates mode. In various implementations, a selection and/or activation of a supplementary metrology position coordinates mode or a standard robot position coordinates mode may be made by a user and/or may be automatically made by the system in response to certain operations and/or instructions. For example, in one implementation a supplementary metrology position coordinates mode may be entered (e.g., automatically or in accordance with a selection by a user) when the articulated robot moves into a particular position (e.g., moves an end tool from a general area where assembly or other operations are performed to a more specific area where workpiece inspection operations are typically performed and where the supplementary metrology position coordinates mode would be utilized). In various implementations, such modes may be implemented by an external control system ECS (e.g., such as the external control system ECS of FIG. 1 utilizing a standard robot position coordinates mode portion 147 and a supplementary metrology position coordinates mode portion 192). In various implementations, a hybrid mode may be operated either independently or as part of a supplementary metrology position coordinates mode and/or may be implemented as a switching between the modes, as will be described in more detail below with respect to FIG. 7.

If at the decision block 610 it is determined that the robot system is not to be operated in a supplementary metrology position coordinates mode, the routine proceeds to a block 620, where the robot system is operated in a standard robot position coordinates mode. As part of the standard robot position coordinates mode, the position sensors (e.g., rotary encoders) of the articulated robot are utilized to control and determine the articulated robot movements and corresponding end tool position with the robot accuracy (e.g., which is based at least in part on the accuracy of the position sensors of the articulated robot). As noted above, the first and second rotary encoders may indicate the positions of the first and second arm portions with a lower degree of accuracy than the position information that is determined utilizing the XY scale. In general, the robot position coordinates mode may correspond to an independent and/or standard mode of operation for the articulated robot (e.g., a mode in which the articulated robot is operated independently, such as when a supplementary metrology position coordinates determination system is not active or is otherwise not provided).

If the robot system is to be operated in a supplementary metrology position coordinates mode, the routine proceeds to a block 630, where at least one input signal is received (i.e., at an image triggering portion) that is related to an end tool position of an articulated robot. A timing is determined of a first imaging trigger signal based on the at least one input signal and the first imaging trigger signal is output to a first imaging configuration. The first imaging configuration acquires a digital image of an XY scale at an image acquisition time in response to receiving the first imaging trigger signal. At a block 640, the acquired image is received (e.g., at a metrology position coordinate processing portion), and at least one respective imageable feature included in the acquired image of the XY scale and the related respective known XY scale coordinate location are identified.

At a block 650, a relative position between a movable one of the XY scale or the first imaging configuration and the first reference position is determined with an accuracy level that is better than a robot accuracy, based on determining an image position of the identified at least one respective imageable feature in the acquired image. The determined relative position is indicative of the metrology position coordinates of the end tool position at the image acquisition time, with an accuracy level that is better than the robot accuracy, at least for x and y metrology position coordinates in an x-y plane that is perpendicular to the z axis. At a block 660, determined position information (e.g., the determined relative position, the determined metrology position coordinates of the end tool position, and/or other related determined position information) is utilized for a designated function (e.g., for workpiece measurement, positioning control of the articulated robot, etc.) As part of such operations or otherwise, the routine may then proceed to a point A, where in various implementations the routine may end, or may otherwise continue as will be described in more detail below with respect to FIG. 6B.

As indicated in FIG. 6B, the routine 600B may continue from the point A to a block 670. As will be described in more detail below, as part of the routine 600B, the determined position information (e.g., from the block 660) may correspond to or otherwise be utilized for determining a first surface location on a workpiece, and for which a second surface location on the workpiece may then be determined (e.g., as part of a workpiece measurement). At the block 670, at least one second input signal is received (e.g., at the image triggering portion) that is related to the end tool position, and the timing of a second imaging trigger signal is determined based on the at least one second input signal. The second imaging trigger signal is output to the first imaging configuration, wherein the first imaging configuration acquires a second digital image of the XY scale at a second image acquisition time in response to receiving the second imaging trigger signal.

At a block 680, the acquired image is received (e.g., at the metrology position coordinate processing portion), and at least one second respective imageable feature included in the second acquired image of the XY scale and a related respective second known XY scale coordinate location are identified. At a block 690, a second relative position between the movable one of the XY scale or the first imaging configuration and the first reference position is determined with an accuracy level that is better than the robot accuracy, based on determining a second image position of the identified at least one second respective imageable feature in the second acquired image. The determined second relative position is indicative of the metrology position coordinates of the end tool position at the second image acquisition time, with an accuracy level that is better than the robot accuracy, at least for x and y metrology position coordinates in an x-y plane that is perpendicular to the z axis. The second relative position is different from the first relative position, and corresponds to a second surface location on the workpiece that is different from the first surface location.

At a block 695, the first and second relative positions and/or related position information is utilized to determine a dimension of the workpiece that corresponds to a distance between the first and second surface locations on the workpiece that correspond to the respective end tool positions (e.g., as indicating the contact point positions, etc.) at the first and second image acquisition times. It will be appreciated that rather than using the position sensors (e.g., rotary encoders) of the articulated robot to determine the first and second surface locations on the workpiece with the robot accuracy, more accurate position information may be determined utilizing the techniques as described above. More specifically, the determination of the first and second surface locations (i.e., corresponding to first and second locations on the XY scale for which a precise distance between such locations may be determined utilizing the techniques as described above in accordance with the accuracy of the XY scale) allows the corresponding dimension on the workpiece between the first and second surface locations to be determined with a high degree of accuracy.

Figure 7:
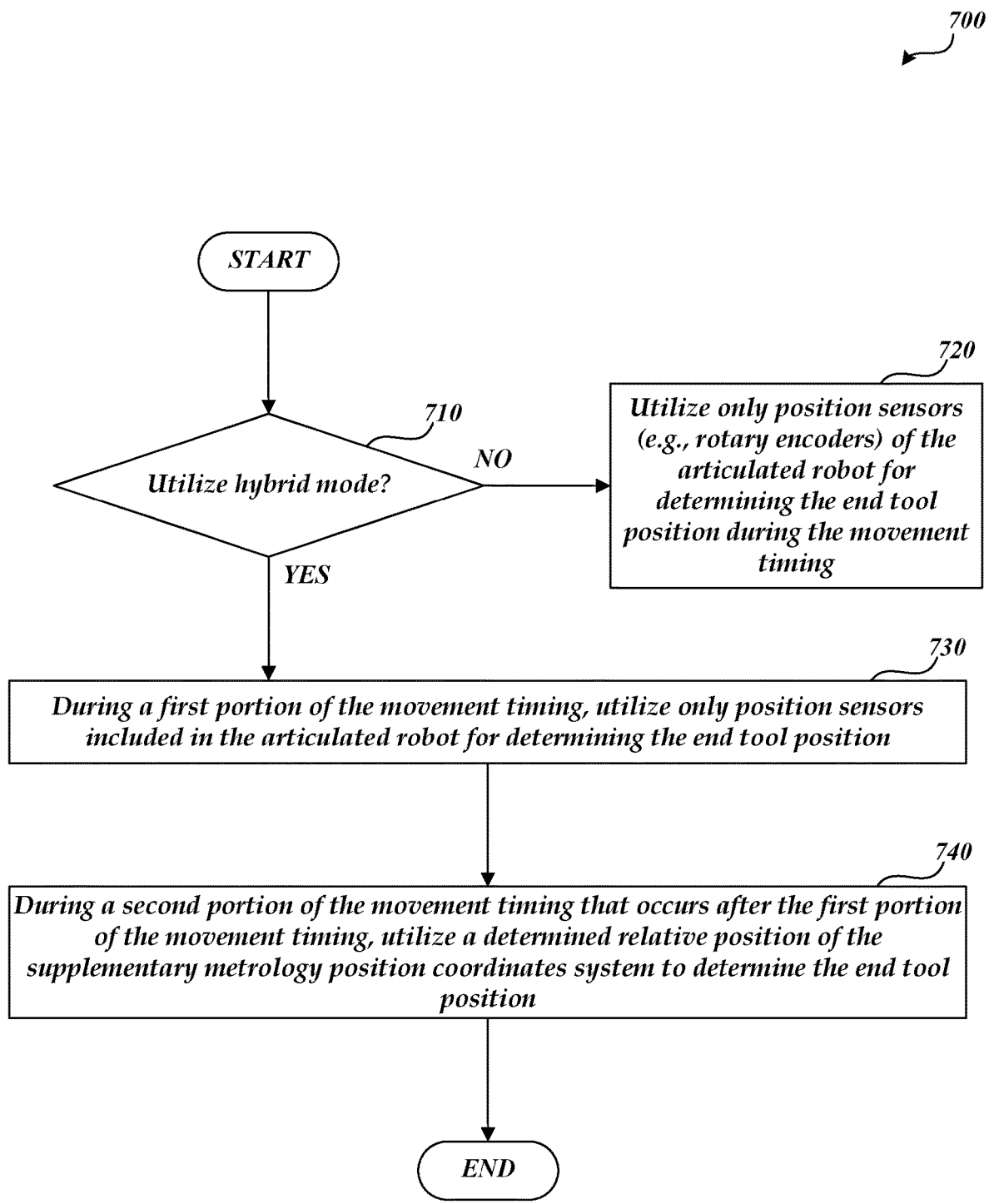
FIG. 7 is a flow diagram illustrating a first exemplary implementation of a routine for determining an end tool position in which position sensors may be utilized during a first portion of a movement timing and a determined relative position of a supplementary metrology position coordinates determination system may be utilized during a second portion of a movement timing.

FIG. 7 is a flow diagram illustrating one exemplary implementation of a routine 700 for determining an end tool position in which different techniques may be utilized during different portions of a movement timing. In general, during the movement timing one or more arm portions of the articulated robot are moved from first rotary positions to second rotary positions (e.g., which may include rotating the arm portions around rotary joints from first rotary orientations to a second rotary orientations). As shown in FIG. 7, at a decision block 710, a determination is made as to whether a hybrid mode will be utilized for determining the end tool position during the movement timing. In various implementations, a hybrid mode may also be representative of a process which includes switching between the supplementary metrology position coordinates mode and the standard robot position coordinates mode. If the hybrid mode is not to be utilized, the routine continues to a block 720, where the position sensors (e.g., rotary encoders) of the articulated robot are solely utilized for determining the end tool position during the movement timing.

If the hybrid mode is to be utilized, the routine proceeds to a block 730, for which during a first portion of a movement timing, the position sensors included in the articulated robot are utilized for determining the end tool position. During such operations, a relative position of a supplementary metrology position coordinates determination system may not be determined and/or is otherwise not utilized to determine the end tool position. At a block 740, during a second portion of the movement timing that occurs after the first portion of the movement timing, a determined relative position of the supplementary metrology position coordinates determination system is utilized to determine the end tool position. It will be appreciated that such operations enable the system to perform initial/fast/coarse movement of the end tool position during the first portion of the movement timing, and to perform more accurate final/slower/fine movement of the end tool position during the second portion of the movement timing.

Figure 8:
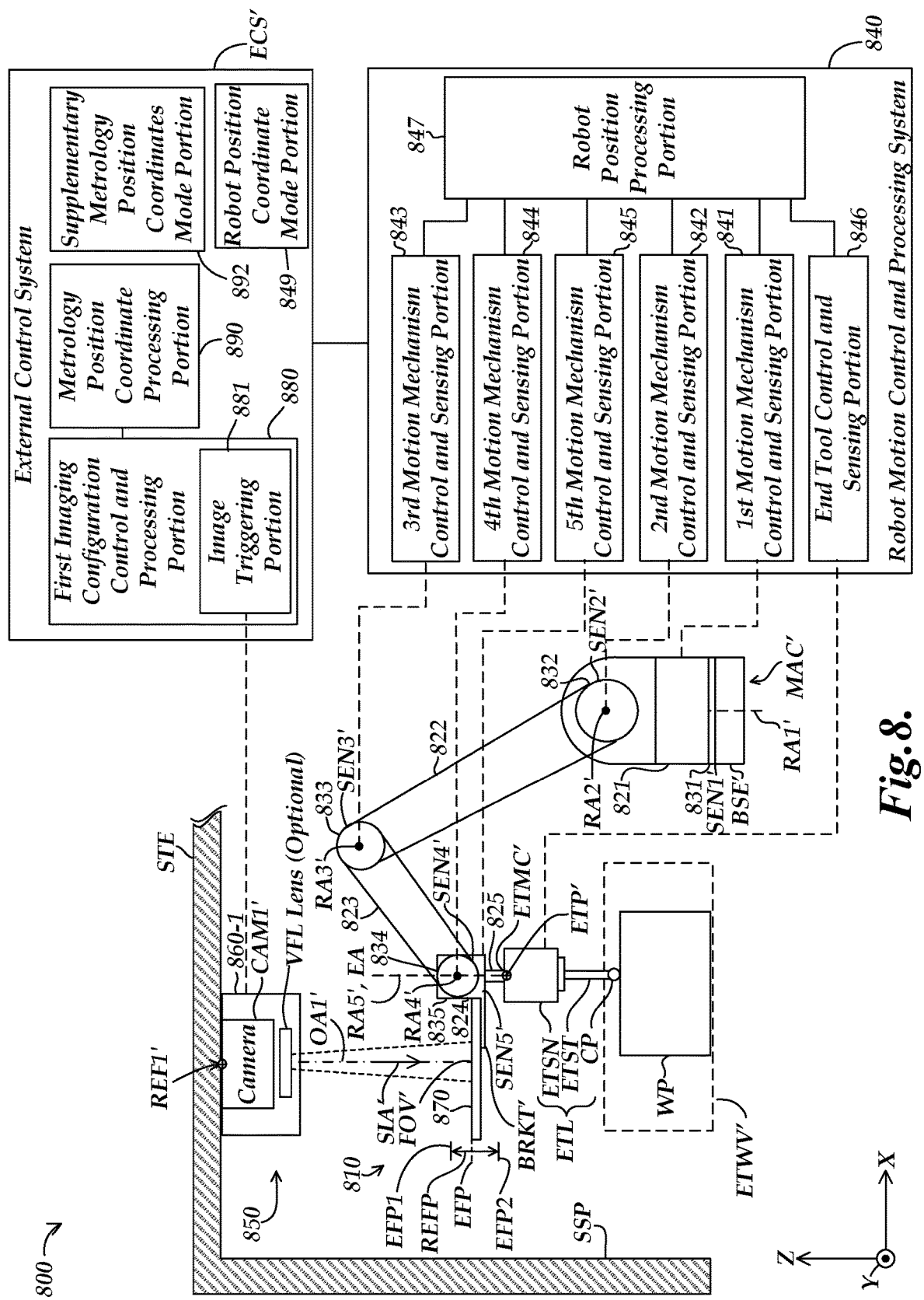
FIG. 8 is a block diagram of a fourth exemplary implementation of a robot system including an articulated robot and a supplementary metrology position coordinates determination system.

FIG. 8 is a block diagram of a fourth exemplary implementation of a robot system 800 including a robot 810 and a supplementary metrology position coordinates determination system 850. The robot 810 (e.g., an articulated robot) includes a movable arm configuration MAC' and a robot motion control and processing system 840. The supplementary metrology position coordinates determination system 850 includes a first imaging configuration 860-1, an XY scale 870, an image triggering portion 881 and a metrology position coordinate processing portion 890. In the configuration of FIG. 8, the XY scale 870 is coupled to the movable arm configuration MAC'. As will be described in more detail below, the first imaging configuration 860-1 has a first optical axis OA1' that may be parallel to a scale imaging axis direction SIA' when in an operational configuration.

In the example of FIG. 8, the movable arm configuration MAC' includes a lower base portion BSE', arm portions 821-825, motion mechanisms 831-835, position sensors SEN1'-SEN5', and an end tool mounting configuration ETMC'. As will be described in more detail below and as further illustrated in FIG. 9, each of the arm portions 821-825 may have respective proximal ends PE1-PE5 and respective distal ends DE1-DE5. In various implementations, some or all of the arm portions 821-825 may be mounted to respective motion mechanisms 831-835 at respective proximal ends PE1-PE5 of the respective arm portions 821-825. In the example of FIG. 8, some or all of the motion mechanisms 831-835 (e.g., rotary joints and/or linear actuators with corresponding motors, etc.) may enable motion (e.g., rotation, linear motion, etc.) of the respective arm portions 821-825 (e.g., about or along respective rotary axes RA1'-RA5', etc.) In various implementations, the position sensors SEN1'-SEN5' (e.g., rotary encoders, linear encoders, etc.) may be utilized for determining the positions (e.g., angular orientations, linear positions, etc.) of the respective arm portions 821-825.

In various implementations, the movable arm configuration MAC' may have a portion that is designated as a terminal portion (e.g., the fifth arm portion 825). In the example configuration of FIG. 8, the end tool mounting configuration ETMC' is located proximate to (e.g., located at) the distal end DE5 of the fifth arm portion 825 (e.g., designated as the terminal portion), which corresponds to a distal end of the movable arm configuration MAC'. In various alternative implementations, a terminal portion of a movable arm configuration may be an element (e.g., a rotatable element, etc.) that is not an arm portion but for which at least part of the terminal portion corresponds to a distal end of the movable arm configuration where the end tool mounting configuration ETMC' is located. In various implementations, the XY scale 870 may be coupled to the movable arm configuration MAC' so as to be proximate to the distal end of the movable arm configuration MAC'. In the implementation of FIG. 8, the XY scale 870 is coupled to the fourth arm portion 824 at a location that is proximate to the distal end of the movable arm configuration MAC'.

In various implementations, the end tool mounting configuration ETMC' may include various elements for coupling and maintaining the end tool ETL proximate to the distal end of the movable arm configuration MAC'. For example, in various implementations, the end tool mounting configuration ETMC' may include an autojoint connection, a magnetic coupling portion and/or other coupling elements as are known in the art for mounting an end tool ETL to a corresponding element. The end tool mounting configuration ETMC' may also include electrical connections (e.g., a power connection, one or more signal lines, etc.) for providing power to and/or sending signals to and from at least part of the end tool ETL (e.g., to and from the end tool sensing portion ETSN).

In various implementations, the end tool ETL may include the end tool sensing portion ETSN and the end tool stylus ETST with the contact point CP (e.g., for contacting a surface of a workpiece WP). The fifth motion mechanism 835 is located proximate to the distal end DE4 of the fourth arm portion 824. In various implementations, the fifth motion mechanism 835 (e.g., a rotary joint with a corresponding motor) may be configured to rotate the fifth arm portion 825 about a rotary axis RA5' (e.g., which in some orientations may be parallel to the optical axis OA1' and/or scale imaging axis direction SIA', such as when so oriented by the rotation of the fourth arm portion 824 by the fourth motion mechanism 834 to be in the operational configuration, etc.) In some implementations, the fifth motion mechanism 835 may also or alternatively include a different type of motion mechanism (e.g., a linear actuator) that is configured to move the fifth arm portion 825 linearly (e.g., up and down in the scale imaging axis direction SIA' when so oriented in the operational configuration). In any case, the end tool ETL is mounted to (e.g., coupled to) the end tool mounting configuration ETMC', and has a corresponding end tool position ETP' with corresponding metrology position coordinates (e.g. x, y and z coordinates). In various implementations, the end tool position ETP' may correspond to or be proximate to the position of the end tool mounting configuration ETMC' (e.g., at or proximate to the distal end DE5 of the fifth arm portion 825 which may correspond to the distal end of the movable arm configuration MAC').

The motion control system 840 is configured to control the end tool position ETP' of the end tool ETL with a level of accuracy defined as a robot accuracy. More specifically, the motion control system 840 is generally configured to control the metrology position coordinates (e.g., x, y and z coordinates) of the end tool position ETP' with the robot accuracy based at least in part on utilizing the motion mechanisms 831-835 and position sensors SEN1'-SEN5' for sensing and controlling the positions of the arm portions 821-825. In various implementations, the motion control and processing system 840 may include motion mechanism control and sensing portions 841-845 that may respectively receive signals from the respective position sensors SEN1'-SEN5', for sensing the positions (e.g., angular positions, linear positions, etc.) of the respective arm portions 821-825, and/or may provide control signals to the respective motion mechanisms 831-835 (e.g., including rotary joints, linear actuators, motors, etc.) for moving the respective arm portions 821-825.

The motion control and processing system 840 may also receive signals from the end tool sensing portion ETSN. In various implementations, the end tool sensing portion ETSN may include circuitry and/or configurations related to the operations of the end tool ETL for sensing a workpiece WP. As will be described in more detail below, in various implementations the end tool ETL (e.g., a touch probe, a scanning probe, a camera, etc.) may utilized for contacting or otherwise sensing surface locations/positions/points on a workpiece WP, for which various corresponding signals may be received, determined and/or processed by the end tool sensing portion ETSN which may provide corresponding signals to the motion control and processing system 840. In various implementations, the motion control and processing system 840 may include an end tool control and sensing portion 846 that may provide control signals to and/or receive sensing signals from the end tool sensing portion ETSN. In various implementations, the end tool control and sensing portion 846 and the end tool sensing portion ETSN may be merged and/or indistinguishable. In various implementations, the motion mechanism control and sensing portions 841-845 and the end tool control and sensing portion 846 may all provide outputs to and/or receive control signals from a robot position processing portion 847 which may control and/or determine the overall positioning of the movable arm configuration MAC' of the robot 810 and corresponding end tool position ETP' as part of the robot motion control and processing system 840.

In various implementations, the supplementary metrology position coordinates determination system 850 may be included with or otherwise added to a robot 810 (e.g., as part of a retrofit configuration for being added to an existing robot 810, etc.) In general, the supplementary metrology position coordinates determination system 850 may be utilized to provide an improved level of accuracy for the determination of the end tool position ETP'. More specifically, as will be described in more detail below, the supplementary metrology position coordinates determination system 850 may be utilized to determine metrology position coordinates that are indicative of the end tool position ETP', with an accuracy level that is better than the robot accuracy, at least for a vector component of the metrology position coordinates that is at least one of transverse or perpendicular to the scale imaging axis direction SIA'. In various implementations (e.g., where the scale imaging axis direction SIA' and the end tool stylus ETST are parallel to the z axis), this may correspond to the accuracy level being better than the robot accuracy at least for x and y metrology position coordinates in an x-y plane that is perpendicular to the z axis).

As illustrated in FIG. 8, the first imaging configuration 860-1 is coupled to the stationary element STE proximate to the robot 810. In various implementations, the stationary element STE may comprise a frame arranged above at least a portion of an end tool working volume ETWV', and for which the first imaging configuration 860-1 is fixed to the frame above a portion of the end tool working volume ETWV'. In various implementations, the stationary element STE may include one or more structural support elements SSP (e.g., extending from a floor, ceiling, etc.) for maintaining the stationary element STE in a fixed location (e.g., with a fixed position and/or orientation) relative to the robot 810.

In various implementations, the end tool working volume ETWV' consists of a volume in which at least a portion of at least one of the end tool ETL and/or the XY scale 870 may be moved. In the example of FIG. 8, the end tool working volume ETWV is illustrated as including a volume in which the contact point CP of the end tool ETL may be moved when inspecting a workpiece. As one alternative example, an end tool working volume may alternatively include a volume in which the XY scale 870 may move when the end tool ETL is moved for inspecting a workpiece. In various implementations, the robot 810 is configured to move the movable arm configuration MAC' so as to move at least a portion of the end tool ETL (e.g., the contact point CP) that is mounted to the end tool mounting configuration ETMC' along at least two dimensions (e.g., x and y dimensions) in the end tool working volume ETWV'. In the example of FIG. 8, the portion of the end tool ETL (e.g., the contact point CP) is movable by the robot 810 along three dimensions (e.g., x, y and z dimensions).

The first imaging configuration 860-1 includes a first camera CAM1' and has an optical axis OA1'. In an operational configuration of the supplementary metrology position coordinates determination system 850, the optical axis OA1' of the first imaging configuration 860-1 is parallel to the direction of the scale imaging axis direction SIA'. The first imaging configuration 860-1 has an effective focus range REFP along its optical axis OA1'. In various implementations, the range REFP may be bound by first and second effective focus positions EFP1 and EFP2, as will be described in more detail below. At a given time, the first imaging configuration 860-1 has an effective focus position EFP that falls within the range REFP. In an implementation where a variable focal length (VFL) lens is used, the range REFP may correspond to the range of focus of the VFL lens.

In various implementations, a VFL lens that is utilized may be a tunable acoustic gradient index of refraction (TAG) lens. With respect to the general operations of such a TAG lens, in various implementations a lens controller (e.g., as included in a first imaging configuration control and processing portion 880) may rapidly adjust or modulate the optical power of the TAG lens periodically, to achieve a high-speed TAG lens capable of a periodic modulation (i.e., at a TAG lens resonant frequency) of 250 kHz, or 70 kHz, or 30 kHz, or the like. In such a configuration, the effective focus position EFP of the first imaging configuration 860-1 may be (e.g., rapidly) moved within the range REFP (e.g., an autofocus search range). The effective focus position EFP1 (or EFPmax) may correspond to a maximum optical power of the TAG lens, and the effective focus position EFP2 (or EFPmin) may correspond to a maximum negative optical power of the TAG lens. In various implementations, the middle of the range REFP may be designated as EFPnom, and may correspond to zero optical power of the TAG lens.

In various implementations, such a VFL lens (e.g., a TAG lens) and/or a corresponding range REFP may be advantageously chosen such that the configuration limits or eliminates the need for macroscopic mechanical adjustments of the first imaging configuration 860-1 and/or adjustment of distances between components in order to change the effective focus position EFP. For example, in an implementation where an unknown amount of tilt or "sag" at the distal end DE5 of the fifth arm portion 825 (e.g., corresponding to the distal end of the movable arm configuration MAC') may occur (e.g., due to the weight and/or specific orientations of the arm portions 821-825, etc.), the precise focus distance from the first imaging configuration 860-1 to the XY scale 870 may be unknown and/or may vary with different orientations of the arm portions, etc. It will also be appreciated that in the example configuration of FIG. 8, the distance between the XY scale 870 and the first imaging configuration 860-1 may generally change in accordance with the general operations of the movable arm configuration MAC' which may move the end tool position ETP' to different locations/distances from the first imaging configuration 860-1 along the scale imaging axis direction SIA' (e.g., as part of the operations for scanning a surface of a workpiece WP, etc.) In such configurations, it may be desirable for a VFL lens to be utilized that can scan or otherwise adjust the effective focus position EFP to determine and accurately focus at the XY scale 870. In various implementations, such techniques utilizing a VFL lens may be utilized in combination with other focus adjusting techniques (e.g., utilized in combination with changeable objective lenses that may also be included in the first imaging configuration 860-1, etc.)

In various implementations, as described above with respect to FIGS. 4 and 5, the XY scale 870 may comprise a nominally planar substrate SUB (e.g., which may be nominally perpendicular to the scale imaging axis direction SIA' and the optical axis OA1' when in the operational configuration) and a plurality of respective imageable features that are distributed on the substrate SUB. The respective imageable features are located at respective known scale coordinates (e.g., x and y scale coordinates) on the XY scale 870. In various implementations, the XY scale 870 may be an incremental or absolute scale, as described above with respect to FIGS. 4 and 5.

In various implementations, the scale plane is defined to nominally coincide with the planar substrate SUB of the XY scale 870 and a direction normal to the scale plane is defined as the scale imaging axis direction SIA'. In various implementations, the robot system 800 may be operable to at least nominally provide an operational configuration of the supplementary metrology position coordinates determination system 850. In the operational configuration of the supplementary metrology position coordinates determination system 850, the movable XY scale 870 is arranged so that the direction of the scale imaging axis direction SIA' is parallel to the optical axis OA1' of the first imaging configuration 860-1 and the scale plane is located within the range of focus REFP of the first imaging configuration 860-1 along the scale imaging axis direction SIA'. It will be appreciated that in order to place the supplementary metrology position coordinates determination system 850 at least nominally in the operational configuration with the above noted characteristics, various adjustments may be made to the positions/orientations of the arm portions 821-825 of the movable arm configuration MAC'.

As used herein, the term "nominally" encompasses variations of one or more parameters that fall within acceptable tolerances. As an example, in one implementation two elements may be defined herein as being nominally parallel when an angle between the two is less than 5 degrees. In one implementation, the optical axis OA1' of the first imaging configuration 860-1 may be correspondingly defined as being nominally parallel to the direction of the scale imaging axis direction SIA' when an angle between the two is less than 5 degrees. The supplementary metrology position coordinates determination system 850 may be correspondingly defined as at least nominally being in the operational configuration (e.g., being at least one of in or nominally in the operational configuration) when the components are arranged (e.g., by the robot system 800) so that the optical axis OA1' of the first imaging configuration 860-1 is at least one of parallel or nominally parallel to the direction of the scale imaging axis direction SIA', and the scale plane is located within the range of focus of the first imaging configuration 860-1 along the scale imaging axis direction SIA'. In various implementations, the supplementary metrology position coordinates determination system 850 may be configured such that when the movable one of the XY scale 870 or the first imaging configuration 860-1 and the stationary one of the XY scale 870 or the first imaging configuration 860-1 are at least nominally arranged in the operational configuration, and the movable arm configuration MAC' is positioned with the XY scale 870 in a field of view FOV' of the first imaging configuration 860-1, then the metrology position coordinate processing portion 890 is operable to determine metrology position coordinates that indicate a relative position between the movable one of the XY scale 870 or the first imaging configuration 860-1 and the first reference position REF1' with an accuracy level that is better than the robot accuracy.

In various implementations, at least part of the robot 810 (e.g., the movable arm configuration MAC') may include at least one respective rotary joint that provides at least one respective rotational degree of freedom for the end tool ETL and/or a portion (e.g., an arm portion) to which the movable one of the XY scale or the first imaging configuration are coupled. In such implementations, the robot 810 may be configured to translate and rotate the movable one of the XY scale or the first imaging configuration relative to the stationary one of the XY scale or the first imaging configuration, including rotating the end tool ETL and/or the portion to which the movable one of the XY scale or the first imaging configuration are coupled, corresponding to the at least one respective rotational degree of freedom, to at least nominally provide the operational configuration. With respect to the example configurations of FIGS. 8 and 9, the at least one respective rotary joint may correspond to at least the fourth motion mechanism 834, and the at least one respective rotational degree of freedom may correspond to at least the rotation around the rotary axis RA4'. In accordance with this configuration, the fourth motion mechanism 834 may be operated to rotate the fourth arm portion 824 so as to cause the scale imaging axis direction SIA' to be at least one of parallel or nominally parallel to the optical axis OA1' (e.g., to at least nominally be in the operational configuration). In various implementations, all or part of the fourth arm portion 824 and/or the XY scale 870 may be able to rotate (e.g., utilizing a corresponding motion mechanism) about an additional rotary axis (not shown), such as a rotary axis that is orthogonal or transverse to the rotary axis RA4'. Similar to rotation about the rotary axis RA4', such adjustments may be made to cause the scale imaging axis direction SIA' to be at least one of parallel or nominally parallel to the optical axis OA1' (e.g., to at least nominally be in the operational configuration). In various implementations, such an additional rotary axis may be designated as a type of roll axis, while the rotary axis RA4' may be designated as a type of pitch axis, and the rotary axis RA1' may be designated as a type of yaw axis.

In certain implementations, such adjustments (e.g., including rotation about the rotary axis RA4', etc.) may be made automatically (e.g., a circuit, routine, etc. may be utilized to continually monitor the orientation of the fourth arm portion 824, such as by using the position sensor SEN4' or other sensor, and to utilize the fourth motion mechanism 834 to continually adjust the orientation to cause the XY scale 870 and scale plane to be level/parallel to an x-y plane or otherwise have the scale imaging axis direction SIA' be parallel to the optical axis OA1'). In various implementations, such operations may be continually or otherwise performed to maintain the supplementary metrology position coordinates determination system 850 at least nominally in the operational configuration.

In various implementations, a robot 810 may also be configured to move the end tool ETL and the movable one of the XY scale 870 or the first imaging configuration 860-1 in a plane parallel to the scale plane, while the supplementary metrology position coordinates determination system 850 is at least nominally in the operational configuration. In various implementations, such movement in a plane parallel to the scale plane may be made in two dimensions (e.g., x and y dimensions), such as by a SCARA robot, an articulated robot, etc., or such movement may be primarily made in one dimension (e.g., an x or y dimension), such as by a linear robot, etc. In the example configurations of FIGS. 8 and 9, the articulated robot 810 may perform such movement in a plane parallel to the scale plane, for example, by utilizing the first motion mechanism 831 to rotate the first arm portion 821 about the rotary axis RA1', thus producing movement (e.g., at the distal end of the movable arm configuration MAC') of the end tool ETL and attached XY scale 870 in two dimensions (e.g., x and y dimensions) in a plane parallel to the scale plane (e.g., which may allow the supplementary metrology position coordinates determination system 850 to at least nominally remain in the operational configuration during such movements).

In various implementations, the image triggering portion 881 and/or the metrology position coordinate processing portion 890 may be included as part of an external control system ECS' (e.g., as part of an external computer, etc.) The image triggering portion 881 may be included as part of the first imaging configuration control and processing portion 880. In various implementations, the image triggering portion 881 is configured to input at least one input signal that is related to the end tool position ETP' and to determine the timing of a first imaging trigger signal based on the at least one input signal, and to output the first imaging trigger signal to the first imaging configuration 860-1. In various implementations, the first imaging configuration 860-1 is configured to acquire a digital image of the XY scale 870 at an image acquisition time in response to receiving the first imaging trigger signal. In various implementations, the metrology position coordinate processing portion 890 is configured to input the acquired image and to identify at least one respective imageable feature included in the acquired image of the XY scale 870 and the related respective known XY scale coordinate location. In various implementations, the external control system ECS' may also include a standard robot position coordinates mode portion 849 and a supplementary metrology position coordinates mode portion 892, for implementing corresponding modes, as will be described in more detail below.

In various implementations, the first imaging configuration 860-1 may include a component (e.g., a subcircuit, routine, etc.) that activates an image integration of the camera CAM1' periodically (e.g., at a set timing interval) for which the first imaging trigger signal from the image triggering portion 881 may activate a strobe light timing or other mechanism to effectively freeze motion and correspondingly determine an exposure within the integration period. In such implementations, if no first imaging trigger signal is received during the integration period, a resulting image may be discarded, wherein if a first imaging trigger signal is received during the integration period, the resulting image may be saved and/or may otherwise be processed/analyzed to determine metrology position coordinates, as will be described in more detail below.

In various implementations, different types of end tools ETL may provide different types of outputs that may be utilized with respect to the image triggering portion 881. For example, in an implementation where the end tool ETL is a touch probe that is used for measuring a workpiece and that outputs a touch signal when it touches the workpiece (e.g., when the contact point CP contacts the workpiece), the image triggering portion 881 may be configured to input that touch signal or a signal derived therefrom as the at least one input signal that the timing of a first imaging trigger signal is determined based on. In various implementations where the end tool ETL is a touch probe, a central axis of the touch probe may be oriented along the scale imaging axis direction SIA' (e.g., with the central axis of the touch probe corresponding to the end tool axis EA). As another example, in an implementation where the end tool ETL is a scanning probe that is used for measuring a workpiece and that provides respective workpiece measurement sample data corresponding to a respective sample timing signal, the image triggering portion 881 may be configured to input that respective sample timing signal or a signal derived therefrom as the at least one input signal. As another example, in an implementation where the end tool ETL is a camera that is used to provide a respective workpiece measurement image corresponding to a respective workpiece image acquisition signal, the image triggering portion 881 may be configured to input that workpiece image acquisition signal or a signal derived therefrom as the at least one input signal.

In the example implementation of FIG. 8, the supplementary metrology position coordinates determination system 850 is configured with the XY scale 870 coupled to the movable arm configuration MAC'. In addition, the first imaging configuration 860-1 is coupled to a stationary element STE (e.g., a frame arranged above and proximate to the robot 810) and defines a first reference position REF1'. In an alternative implementation (e.g., as described above with respect to FIG. 3), a supplementary metrology position coordinates determination system may be configured with the first imaging configuration 860-1 coupled to a movable arm configuration MAC' proximate to the distal end of the movable arm configuration MAC', and the XY scale 870 coupled to a stationary element STE and defining a first reference position REF1.

In either case, as will be described in more detail below, the supplementary metrology position coordinates determination system 850 may be configured such that when the movable one of the XY scale 870 or the first imaging configuration 860-1 and the stationary one of the XY scale 870 or the first imaging configuration 860-1 are arranged in the operational configuration, and the movable arm configuration MAC' is positioned with the XY scale 870 in a field of view FOV' of the first imaging configuration 860-1, then the metrology position coordinate processing portion 890 is operable to determine metrology position coordinates that indicate a relative position between the movable one of the XY scale 870 or the first imaging configuration 860-1 and the first reference position REF1' with an accuracy level that is better than the robot accuracy, based on determining an image position of the identified at least one respective imageable feature in the acquired image. The determined metrology position coordinates are indicative of the end tool position ETP' at the image acquisition time, with an accuracy level that is better than the robot accuracy, at least for a vector component of the metrology position coordinates that is at least one of transverse or perpendicular to the scale imaging axis direction SIA'. In various implementations, the supplementary metrology position coordinates determination system 850 may be configured to determine the metrology position coordinates of the end tool position ETP' at the image acquisition time, based on the determined metrology position coordinates that indicate the relative position of the movable one of the XY scale 870 or the first imaging configuration 860-1 and a known coordinate position offset between the end tool position ETP' and the movable one of the XY scale 870 or the first imaging configuration 860-1.

It will be appreciated that a similar process for determining the metrology position coordinates of the end tool position ETP may be performed by the robot system 100 of FIG. 1, as previously described in part. More specifically, in the robot system 100, a movable arm configuration MAC may include the first and second arm portions 120 and 130, the first and second rotary joints 125 and 135 (e.g., included as part of first and second motion mechanisms), the position sensors SEN1 and SEN2, and the end tool configuration ETCN. As described above, the end tool configuration ETCN may include the Z-motion mechanism ZMM (e.g., included as part of a third motion mechanism), the Z-arm portion ZARM (e.g., designated as a third arm portion), the position sensor SEN3 and the end tool coupling portion ETCP (e.g., included as part of an end tool mounting configuration ETMC). In various implementations, the operable work volume OPV may also or alternatively be designated as an end tool working volume ETWV.

In the configuration of FIG. 1, the robot 110 is configured to move the movable arm configuration MAC so as to move at least a portion of the end tool ETL that is mounted to the end tool mounting configuration ETMC along at least two dimensions in the end tool working volume ETWV'. The motion control system 140 is configured to control the end tool position ETP with a level of accuracy defined as the robot accuracy, based at least in part on sensing and controlling the position of the movable arm configuration MAC using at least one position sensor included in the robot 110. A scale plane is defined to nominally coincide with the planar substrate of the XY scale 170, and a direction normal to the scale plane is defined as the scale imaging axis direction SIA. In an operational configuration of the supplementary metrology position coordinates determination system 150, at least one of the XY scale 170 or the first imaging configuration 160 is arranged with the optical axis OA1 of the first imaging configuration 160 parallel to the direction of the scale imaging axis direction SIA and with the scale plane located within the range of focus REFP of the first imaging configuration 160 along the scale imaging axis direction SIA.

The supplementary metrology position coordinates determination system 150 is configured such that when the movable one of the XY scale 170 or the first imaging configuration 160 and the stationary one of the XY scale 170 or the first imaging configuration 160 are arranged in the operational configuration, and the movable arm configuration MAC is positioned with the XY scale 170 in a field of view of the first imaging configuration 160, then the metrology position coordinate processing portion 190 is operable to determine metrology position coordinates that indicate a relative position between the movable one of the XY scale 170 or the first imaging configuration 160 and the first reference position REF1 with an accuracy level that is better than the robot accuracy, based on determining an image position of the identified at least one respective imageable feature in the acquired image. The determined metrology position coordinates are indicative of the end tool position ETP at the image acquisition time, with an accuracy level that is better than the robot accuracy, at least for a vector component of the metrology position coordinates that is at least one of transverse or perpendicular to the scale imaging axis direction SIA. In various implementations, the supplementary metrology position coordinates determination system 150 may be configured to determine the metrology position coordinates of the end tool position ETP at the image acquisition time, based on the determined metrology position coordinates that indicate the relative position of the movable one of the XY scale 170 or the first imaging configuration 160 and a known coordinate position offset between the end tool position ETP and the movable one of the XY scale 170 or the first imaging configuration 160.

It will be appreciated that the robot systems such as those illustrated in FIGS. 1 and 8 may have certain advantages over various alternative systems. For example, in various implementations systems such as those disclosed herein may be smaller and/or less expensive than alternative systems utilizing technologies such as laser trackers or photogrammetry for tracking robot movement/positions, and may also have higher accuracy in some implementations. The disclosed systems also do not take up or obscure any part of the end tool working volume ETWV or ETWV', such as alternative systems that may include a scale or fiducial on the ground or stage, or otherwise in the same area (e.g., in the end tool working volume ETWV or ETWV') where workpieces may otherwise be worked on and/or inspected, etc.

Figure 9:
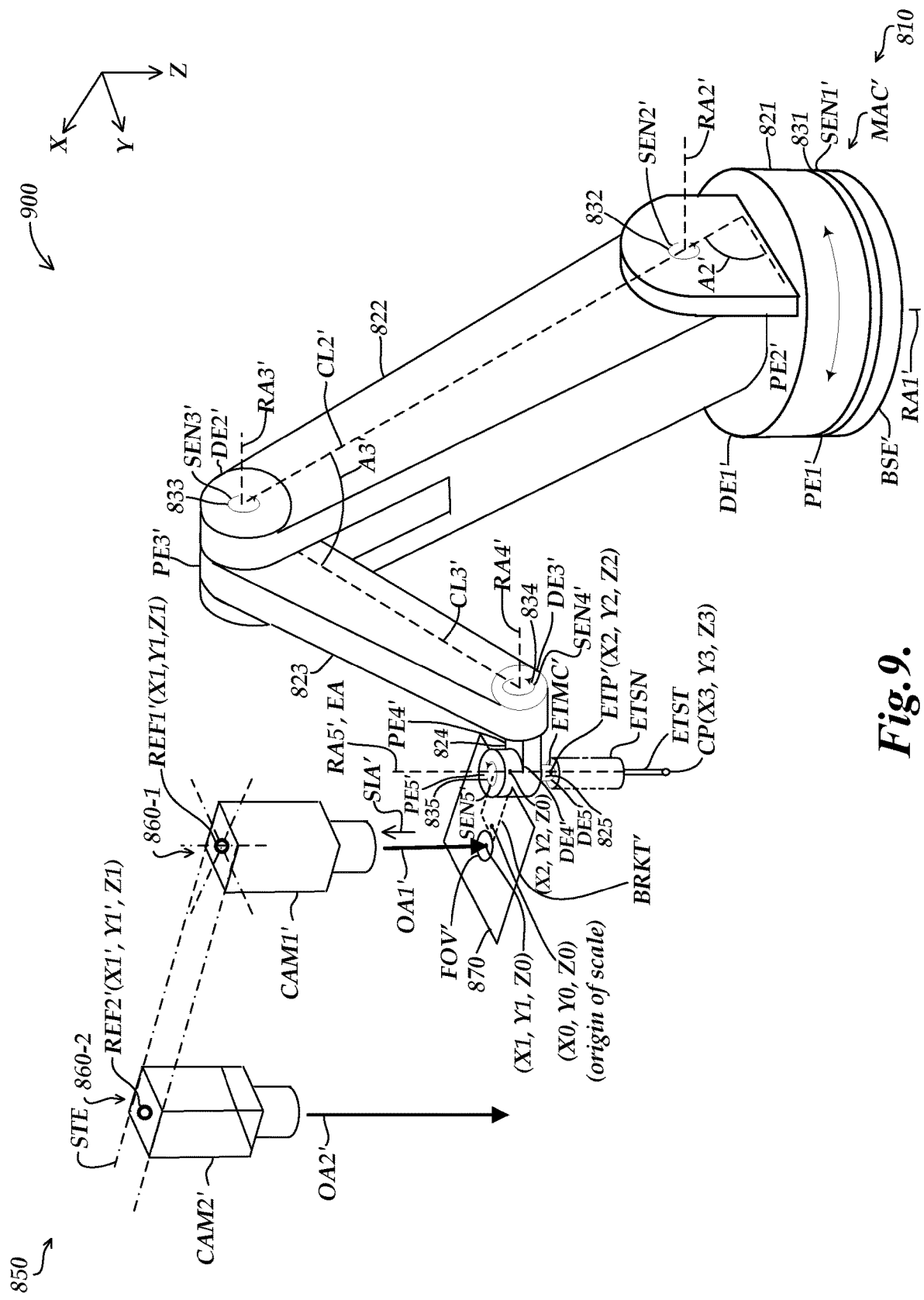
FIG. 9 is an isometric diagram of a portion of a fifth exemplary implementation of a robot system similar to the robot system of FIG. 8 including an articulated robot, in which a first imaging configuration is coupled to a stationary element.

FIG. 9 is an isometric diagram of a portion of a fifth exemplary implementation of a robot system 900 similar to the robot system 800 of FIG. 8 in which the first imaging configuration 860-1 is coupled to a stationary element STE (e.g., the stationary element STE of FIG. 8). It will be appreciated that, similar to the numbering schemes described above, certain named or numbered components (e.g., 8XX, 8XX' or 9XX) of FIG. 9 may correspond to and/or have similar operations as identically or similarly named or numbered counterpart components (e.g., 8XX) of FIG. 8, or of other figures, and may be understood to be similar or identical thereto and may otherwise be understood by analogy thereto and as otherwise described below. As noted above, this naming and numbering scheme to indicate elements having analogous and/or identical design and/or function is generally applied to the various figures of this application (e.g., FIGS. 1-5, 8 and 9).

In the configuration of FIG. 9 (i.e., similar to the configuration of FIG. 8), the stationary element STE that the first imaging configuration 860-1 is coupled to may comprise a frame arranged above the robot 810. The movable arm configuration MAC' includes the arm portions 821-825 and the XY scale 870 is coupled to the movable arm configuration MAC'. In various implementations, a bracket BRKT' is utilized for coupling the XY scale 870 to the movable arm configuration MAC'. In other configurations, other coupling configurations may be utilized for coupling the XY scale 870 to the movable arm configuration MAC'.

In various implementations, the XY scale 870 may be coupled to the movable arm configuration MAC' so as to extend from an end, side or other orientation relative to the movable arm configuration MAC'. For example, in FIG. 8 the XY scale 870 is illustrated as extending from a proximal end of the movable arm configuration MAC' in a radial direction away from the central base portion BSE' (e.g., around which the movable arm configuration MAC' may rotate). As another example, in FIG. 9 the XY scale 870 is illustrated as extending from a side of the movable arm configuration MAC' (e.g., such that the XY scale 870 might be described as being tucked back or otherwise extending from the side of the movable arm configuration MAC', as opposed to the configuration in FIG. 8 where the XY scale 870 extends radially further out than any other portion of the movable arm configuration MAC', so as to potentially require extra radial clearance as the movable arm configuration MAC' pivots around the base portion BSE', etc.)

In various implementations, the position and/or orientation of the XY scale 870 as coupled to the movable arm configuration MAC' may be adjustable, although may also be temporarily locked or otherwise fixed in a given position/orientation (e.g., for a series of measurements, etc.) For example, for a given measurement application, the position/orientation of the XY scale 870 relative to the movable arm configuration MAC' may be adjustable (e.g., to be tucked back out of the way on one side such as illustrated in FIG. 9, or to be set to radially extend as illustrated in FIG. 8, but for which each specific setting may have a known position/orientation and associated calibration etc. and may be maintained throughout a given measurement process). During a given measurement process (e.g., while a series of measurement points on a workpiece surface are being measured/determined, etc.) the position/orientation of the XY scale 870 may be locked in place or otherwise fixed relative to the movable arm configuration MAC' (e.g., so that the positions of the XY scale features relative to the robot arm portion to which the XY scale 870 is attached may be nominally fixed, and the end tool position ETP' may correspondingly be accurately determined in accordance with the processes as described herein). In various corresponding implementations, the XY scale 870 may generally be described as being adjustable in pitch and/or roll about local x and/or y axes (e.g., rotated about the rotary axis RA4' and/or an additional rotary axis not shown that is orthogonal or transverse to the rotary axis RA4', such as for at least nominally achieving the operational configuration), although may be nominally fixed (e.g., during a given measurement process) relative to yaw vector components in the scale plane (e.g., fixed during a given measurement process so as to not allow rotation of the XY scale 870 independently of a central sub-portion of the movable arm configuration MAC' about an axis that is nominally normal to the scale plane).

As noted above, in various implementations the first imaging configuration 860-1 may be coupled to either the stationary element STE (e.g., as illustrated in FIGS. 8 and 9) or to the movable arm configuration MAC' (e.g., similar to the configuration illustrated in FIG. 3). In an implementation similar to that of FIG. 3, the first imaging configuration 860-1 may be coupled to the movable arm configuration MAC' such that the optical axis OA1' of the first imaging configuration 860-1 is as close as practical to being aligned with the contact point CP along the Z axis direction (e.g., so as to reduce the magnitude of certain types of position errors that may occur due to sag or tilt of various portions of the movable arm configuration MAC' and end tool ETL under certain circumstances). In any case, in an operational configuration of the supplementary metrology position coordinates determination system 850, the first imaging configuration 860-1 may be arranged with the optical axis OA1' of the first imaging configuration 860-1 parallel to the direction of the scale imaging axis direction SIA' and with the scale plane located within the range of focus of the first imaging configuration 860-1 along the scale imaging axis direction SIA'.

In various implementations, the movable one of the XY scale 870 (e.g., as illustrated in FIGS. 8 and 9) or the first imaging configuration 860-1 (e.g., similar to the configuration of FIG. 3) may be described as being coupled to a central sub-portion (e.g., including the arm portion 823 and at least some proximal elements thereto) of the movable arm configuration MAC' through a distal sub-portion comprising at least a first distal sub-portion rotating element (e.g., arm portion 824) that rotates about a first distal sub-portion rotation axis (e.g., rotary axis RA4). In various implementations, the distal sub-portion may comprise a bracket (e.g., bracket BRKT) that couples the movable one of the XY scale 870 or the first imaging configuration 860-1 to the first distal sub-portion rotating element (e.g., arm portion 824). In various implementations, the first distal sub-portion rotation axis (e.g., rotary axis RA4) may be nominally parallel to the scale plane (e.g., if the XY scale 870 is the movable one) or may be nominally orthogonal to the optical axis OA1' (e.g., if the first imaging configuration 860-1 is the movable one). In various implementations, the central sub-portion may include at least a first central sub-portion rotating element (e.g., arm portion 822 and/or 823) that rotates about a rotation axis (e.g., rotation axis RA2 and/or RA3) that is nominally parallel to the first distal sub-portion rotation axis (e.g., rotation axis RA4).

Such implementations may correspond to a configuration in which the XY scale 870 may be rotated in pitch and roll as needed to offset any pitch and roll of any arm portion in the movable arm configuration MAC', so that the XY scale 870 can be made at least nominally normal to the optical axis OA1' (e.g., to at least nominally achieve the operational configuration). In the example of FIGS. 8 and 9, certain arm portions of the movable arm configuration MAC' are able to be made to generally pitch by rotation about their rotation axes, and the movable arm configuration MAC' as a whole can rotate around the rotary axis RA1' (e.g., corresponding to yaw movement in certain implementations). Roll motion (e.g., about a central arm portion axis) is not generally illustrated in the configuration of FIGS. 8 and 9 for the movement of the XY scale 870, but may in various implementations be added as a compensating roll axis (e.g., a motion mechanism may be added near the XY scale 870 for achieving roll motion of the XY scale 870 and/or part or all of the arm portion 824 or other portion to which the XY scale 870 is coupled, etc.)

In various implementations, the distal sub-portion (e.g., including arm portion 824 and bracket BRKT) that couples the movable one of the XY scale 870 or the first imaging configuration 860-1 to the central sub-portion includes no distal sub-portion rotation axis that is nominally orthogonal to the scale plane if the XY scale 870 is the movable one, and no distal sub-portion rotation axis that is nominally parallel to the optical axis OA1' if the first imaging configuration 860-1 is the movable one. Such implementations may correspond to a configuration in which the XY scale 870 may not rotate in the scale plane, so that the scale features are nominally fixed relative to one or more of the arm portions of the movable arm configuration MAC' (e.g., arm portion 824) with respect to the XY locations (e.g., are nominally fixed relative to yaw vector components in the scale plane, such as indicating no independent rotation about a Z axis that is nominally normal to the scale). As described above, in various implementations the XY scale 870 may be fixed in such a manner during various measurement procedures, but may be adjustable/rotatable to different fixed orientations/positions relative to the movable arm configuration MAC' (e.g., relative to arm portion 824) in order to achieve a desired orientation/position for a particular measurement application.

As illustrated in FIG. 9, the first arm portion 821 (e.g., an upper base portion) is mounted to the first motion mechanism 831 (e.g., including a rotary joint) at a proximal end PE1 of the first arm portion 821. The first motion mechanism 831 is located at an upper end of the lower supporting base portion BSE' and has a rotary axis RA1' aligned along the scale imaging axis direction SIA' such that the first arm portion 821 rotates in a plane that is perpendicular to the scale imaging axis direction SIA'. In an implementation where the optical axis OA1' of the first imaging configuration 860-1 (e.g., and correspondingly the scale imaging axis direction SIA' in the operational configuration) is parallel to the z axis, the first arm portion 821 may correspondingly rotate in an x-y plane that is perpendicular to the z axis. In various implementations, the position sensor SEN1' (e.g., a rotary encoder) may be utilized for determining the angular position (e.g., the angular orientation) of the first arm portion 820.

The second motion mechanism 832 (e.g., including a rotary joint) is located proximate to a distal end DE1 of the first arm portion 821. The second motion mechanism 832 has a rotary axis RA2' (e.g., which may be nominally aligned along a direction that is perpendicular to the optical axis OA1' and/or the scale imaging axis direction SIA'). The second arm portion 822 is mounted to the second motion mechanism 832 at a proximal end PE2 of the second arm portion 822, such that the second arm portion 822 moves about the second motion mechanism 832 (e.g., in a plane that may be nominally parallel to the optical axis OA1' and/or the scale imaging axis direction SIA'). In various implementations, the position sensor SEN2' (e.g., a rotary encoder) may be utilized for determining the angular position (e.g., in a plane that may be parallel to the optical axis OA1' and/or the scale imaging axis direction SIA') of the second arm portion 822.

The third motion mechanism 833 (e.g., including a rotary joint) is located at a distal end DE2 of the second arm portion 822. The third motion mechanism 833 has a rotary axis RA3' (e.g., which may be nominally aligned along a direction that is perpendicular to the optical axis OA1' and/or the scale imaging axis direction SIA'). The third arm portion 823 is mounted to the third motion mechanism 833 at a proximal end PE3 of the third arm portion 823, such that the third arm portion 823 moves about the third motion mechanism 833 (e.g., in a plane that may be nominally parallel to the optical axis OA1' and/or scale imaging axis direction SIA'). In various implementations, the position sensor SEN3' (e.g., a rotary encoder) may be utilized for determining the angular position (e.g., in a plane that may be parallel to the optical axis OA1' and/or scale imaging axis direction SIA') of the third arm portion 823.

The fourth motion mechanism 834 (e.g., including a rotary joint) is located at a distal end DE3 of the third arm portion 823. The fourth motion mechanism 834 has a rotary axis RA4' (e.g., which may be nominally aligned along a direction that is perpendicular to the optical axis OA1' and/or the scale imaging axis direction SIA'). The fourth arm portion 824 is mounted to the fourth motion mechanism 834 at a proximal end PE4 of the fourth arm portion 824, such that the fourth arm portion 824 rotates (e.g., in a plane that may be nominally parallel to the optical axis OA1' and/or scale imaging axis direction SIA'). In various implementations, the position sensor SEN4' (e.g., a rotary encoder) may be utilized for determining the angular position (e.g., in a plane that may be parallel to the optical axis OA1' and/or the scale imaging axis direction SIA') of the fourth arm portion 824.

The fifth motion mechanism 835 may be located at a distal end DE4 of the fourth arm portion 824. As noted above, in some implementations, the fifth motion mechanism 835 (e.g., including a rotary joint) may be configured to rotate the fifth arm portion 825 about a rotary axis RA5' (e.g., which may be parallel to the scale imaging axis direction SAI' and in some orientations may be parallel to the optical axis OA1', such as when in the operational configuration as so oriented by the rotation of the fourth arm portion 824 by the fourth motion mechanism 834, etc.) In such configurations, the fifth arm portion 825 may be mounted to the fifth motion mechanism 835 at a proximal end PE5 of the fifth arm portion 825. In some implementations, the fifth motion mechanism 835 may also or alternatively include a different type of motion mechanism (e.g., a linear actuator) that is configured to move the fifth arm portion 825 linearly (e.g., up and down in the scale imaging axis direction SIA' when so oriented in the operational configuration). In various implementations, the fifth arm portion 825 may be designated as a terminal portion of the movable arm configuration MAC', wherein the distal end of the movable arm configuration MAC' corresponds to the distal end DE5 of the fifth arm portion 825, where the end tool mounting configuration ETMC' may be located. In an implementation where the fifth motion mechanism 835 includes a rotary joint and the scale imaging axis direction SIA' is parallel to the z axis in the operational configuration, the end tool ETL may correspondingly rotate in an x-y plane that is perpendicular to the z axis.

In various implementations, as noted above the position and/or orientation of the XY scale 870 as coupled to the movable arm configuration MAC' may be adjustable, although may also be temporarily locked or otherwise fixed in a given position/orientation (e.g., for a series of measurements, etc.) In various implementations, the XY scale 870 and/or at least part of an arm portion that the XY scale 870 is coupled to may be configured to be rotated (e.g., by a corresponding motion mechanism or manually rotated by a user, etc.) so that the contact point CP of the end tool ETL may be moved into contact with a workpiece WP without the XY scale 870 interfering. More specifically, when the contact point CP is moved toward a workpiece, in certain instances and for certain orientations the XY scale 870 may inadvertently come into physical contact with the workpiece WP or other object or barrier before the contact point CP can be moved into contact with the workpiece WP. In order to prevent such occurrences, in various implementations the XY scale 870 may be rotated away from the workpiece WP or other object or barrier before the measurement process begins so as to allow the contact point CP to come into contact with the workpiece WP without the XY scale 870 getting in the way or otherwise interfering.

In various implementations, different reference axes and lines may be designated for referencing certain movements, coordinates and angles of the components of the movable arm configuration MAC'. As some specific examples, as illustrated in FIG. 9 the second and third arm portions 822 and 823 may each have designated center lines CL2' and CL3', respectively, passing down the centers of the respective arm portions. An angle A2' (e.g., which may correspond to an amount of rotation of the second motion mechanism 832) may be designated as occurring between the center line CL2' of the second arm portion 822 and plane (e.g., parallel to the scale plane in the operational configuration, which may be in an x-y plane when the optical axis OA1' is parallel to the z axis). An angle A3' may be designated as occurring between the center line CL2' of the second arm portion 822 and the center line CL3' of the third arm portion 823 (e.g., in accordance with an amount of rotation of the third motion mechanism 833 about the third rotary axis RA3'). It will be appreciated that the other arm portions 821, 824 and 825 may similarly have corresponding reference lines and/or axes, etc. for referencing certain movements, coordinates and angles of the components of the movable arm configuration MAC'.

In various implementations, the end tool ETL may be mounted (e.g., coupled) to the end tool mounting configuration ETMC' proximate to the distal end DE5 of the fifth arm portion 825. The end tool ETL may be designated as having an end tool axis EA (e.g., passing through the middle and/or central axis of the stylus ETST) which may coincide with the fifth rotary axis RA5' of the fifth motion mechanism 835 and which may intersect with an extended line of the fourth rotary axis RA4' of the fourth motion mechanism 834. In various implementations, the end tool axis EA passes through the end tool position ETP', and has a known coordinate position offset from the XY scale 870, and in the operational configuration is parallel to the scale imaging axis direction SIA' (e.g., such that the end tool ETL with the stylus ETST is oriented parallel to the scale imaging axis direction SIA'). Correspondingly, there may be a known coordinate position offset between the end tool position ETP' and the XY scale 870. For example, the XY scale 870 may have a designated reference point (e.g., at a center or edge of the XY scale 870) which has a known coordinate position offset (e.g., a known distance in a plane that is parallel to the scale plane or otherwise) from the end tool axis EA (e.g., and correspondingly from the end tool position ETP'). In various implementations, such a known coordinate position offset may be expressed in terms of known offset components (e.g., a known x offset and a known y offset and/or a known distance combined with a known angular orientation of the XY scale 870 relative to at least part of the movable arm configuration MAC', such as relative to the fourth arm portion 824, etc.)

In various implementations, the known coordinate position offset between the end tool position ETP' and the XY scale 870 may be utilized as part of the process for determining the metrology position coordinates of the end tool position ETP'. More specifically, as noted above, the supplementary metrology position coordinates determination system 850 may be configured such that the metrology position coordinate processing portion 890 operates to determine metrology position coordinates that indicate a relative position between the XY scale 870 and the first reference position REF1' (i.e., as defined by the stationary first imaging configuration 860-1), based on determining an image position of the identified at least one respective imageable feature (i.e., of the XY scale 870) in the acquired image. The supplementary metrology position coordinates determination system 850 may further be configured to determine the metrology position coordinates of the end tool position ETP', based on the determined metrology position coordinates which indicate the relative position (i.e., between the XY scale 870 and the first reference position REF1'), and a known coordinate position offset between the end tool position ETP' and the movable XY scale 870. In one specific example implementation, the known coordinate position offset (e.g., expressed in terms of known offset components, such as a known x offset and a known y offset and/or a known distance combined with a known angular orientation of the XY scale 870) may be added to or otherwise combined with the determined metrology position coordinates that indicate the relative position (i.e., between the XY scale 870 and the first reference position REF1') in order to determine the metrology position coordinates of the end tool position ETP'.

As one specific example position coordinate configuration, in an implementation where in the operational configuration the scale imaging axis direction SIA' is parallel to the z axis, the XY scale 870 may be designated as having a reference position (e.g., an origin location) at X0, Y0, Z0 (e.g., which for an origin location may have values of 0,0,0). In such a configuration, the reference location REF1' (i.e., as defined by the stationary first imaging configuration 860-1) may be at relative coordinates of X1, Y1, Z1, and a center of a corresponding field of view FOV1' (e.g., corresponding to an acquired image) may be at relative coordinates of X1, Y1, Z0. A location of the end tool axis EA in an x-y plane extending from the XY scale 870 may be designated as having relative coordinates of X2, Y2, Z0. The end tool position ETP' may be designated as having coordinates of X2, Y2, Z2. In various implementations, the end tool ETL may have a contact point CP (e.g., at the end of an end tool stylus ETST for contacting a workpiece) which may be designated as having coordinates X3, Y3, Z3. In an implementation where the contact point CP of the end tool ETL does not vary in the x or y directions relative to the rest of the end tool and where the end tool axis EA is parallel to the z axis in the operational configuration, the X3 and Y3 coordinates may be equal to the X2 and Y2 coordinates, respectively. It will be understood that some implementations may include additional respective XY scales (e.g., analogous to the XY scale 170 and/or 870, etc., which may be designated as having respective reference locations (e.g., analogous to but different from the reference location REF1 and/or REF1', etc.) In such implementations, the XY scales in addition to the "first" XY scale 170 and/or 870, etc. (e.g. second XY scale, third XY scale, and so on) may be associated with respective high accuracy supplementary metrology position coordinates determination volumes (e.g., respective end tool working volumes, etc.) at respective locations within an overall working volume of a robot.

In one specific example implementation, an acquired image may be analyzed by the metrology position coordinate processing portion 890 to determine metrology position coordinates that indicate a relative position (e.g., to determine the X1, Y1 coordinates corresponding to the center of the field of view FOV1' of the stationary first imaging configuration 860-1). Such a determination may be made in accordance with standard camera/scale image processing techniques (e.g., for determining a location of camera relative to a scale). Various examples of such techniques are described in U.S. Pat. Nos. 6,781,694; 6,937,349; 5,798,947; 6,222,940 and 6,640,008, each of which is hereby incorporated herein by reference in its entirety. In various implementations, such techniques may be utilized to determine the location of a field of view (e.g., as corresponding to a position of a camera) within a scale range (e.g., within the XY scale 870), as described above with respect to FIGS. 4 and 5. In various implementations, such a determination may include identifying at least one respective imageable feature included in the acquired image of the XY scale 870 and the related respective known XY scale coordinate location. Such a determination may correspond to determining metrology position coordinates that indicate a relative position between the XY scale 870 and the first reference position REF1' (i.e., as defined by the stationary first imaging configuration 860-1). The relative X2, Y2 coordinates (i.e., of the end tool position ETP') may then be determined according to the known coordinate position offset between the end tool position ETP' and the XY scale 870 (e.g., adding known x and y position offset values to X1 and Y1 in order to determine X2 and Y2).

As noted above, in various implementations the determined metrology position coordinates (e.g., corresponding to the determination of the X1, Y1 coordinates relative to the X0, Y0 coordinates) are indicative of the end tool position (e.g., the X2, Y2 coordinates) at the image acquisition time, with an accuracy level that is better than the robot accuracy, at least for a vector component of the metrology position coordinates that is at least one of transverse or perpendicular to the scale imaging axis direction. In the above example, in a configuration with the scale imaging axis direction SIA' being parallel to the z axis in the operational configuration, this may correspond to the accuracy level being better than the robot accuracy, at least for x and y metrology position coordinates in an x-y plane that is perpendicular to the z axis (or more generally, better than the robot accuracy for metrology position coordinates in a coordinate plane analogous to the x-y plane, but that is transverse to the z axis and not necessarily perfectly perpendicular to the z axis, in various implementations). More specifically, in such a configuration, a vector component of the metrology position coordinates that is perpendicular to the scale imaging axis direction SIA' may correspond to a vector represented by the component pair (X1-X0, Y1-Y0), or where X0 and Y0 equal 0, simply (X1, Y1).

In various implementations, the supplementary metrology position coordinates determination system 850 may further include one or more additional imaging configurations. For example, as illustrated in FIG. 9, the supplementary metrology position coordinates determination system 850 may include a second imaging configuration 860-2 having a second camera CAM2' and a second optical axis OA2' that is parallel to the direction of the scale imaging axis direction SIA' when in the operational configuration. The second imaging configuration 860-2 may define a second reference position REF2' (e.g., having relative coordinates of X1', Y1' and Z1). The second imaging configuration 860-2 may have an effective focus range REFP along its optical axis OA2'. In such a configuration, the image triggering portion 881 may be further configured to input at least one input signal that is related to the end tool position ETP' and determine the timing of a second imaging trigger signal based on the at least one input signal and output the second imaging trigger signal to the second imaging configuration 860-2. In various implementations, the second imaging configuration 860-2 may be configured to acquire a digital image of the XY scale 870 at an image acquisition time in response to receiving the second imaging trigger signal. The metrology position coordinate processing portion 890 may be further configured to input the acquired image and identify at least one respective imageable feature included in the acquired image of the XY scale 870 and the related respective known XY scale coordinate location.

In various implementations, the metrology position coordinate processing portion 890 may be operable to determine metrology position coordinates that indicate a relative position between the XY scale 870 and the second reference position REF2' with an accuracy level that is better than the robot accuracy, based on determining an image position of the identified at least one respective imageable feature in the acquired image. In such an implementation, the determined metrology position coordinates are indicative of the end tool position ETP' at the image acquisition time, with an accuracy level that is better than the robot accuracy, at least for a vector component of the metrology position coordinates that is at least one of transverse or perpendicular to the scale imaging axis direction.

In various implementations, the at least one input signal that is input to the image triggering portion 881 includes one or more signals derived from the motion control system 840. In such configurations, the image triggering portion 881 may be configured to determine whether the XY scale 870 is aligned with the first or second imaging configuration 860-1 or 860-2 based on the one or more signals derived from the motion control system 840. If the XY scale 870 is determined to be aligned with the first imaging configuration 860-1 (e.g., such that a sufficient portion of the XY scale 870 is imaged by the first imaging configuration 860-1) the image triggering portion 881 is configured to output the first imaging trigger signal. Conversely, if the XY scale 870 is determined to be aligned with the second imaging configuration 860-2 (e.g., such that a sufficient portion of the XY scale 870 is imaged by the second imaging configuration 860-2) the image triggering portion 881 is configured to output the second imaging trigger signal. It will be appreciated that in such an implementation, the XY scale 870 may be in the operational configuration with respect to at least one of the first imaging configuration 860-1 or the second imaging configuration 860-2.

As described above, in various implementations the incremental XY scale 170A of FIG. 4 may be utilizable as the XY scale 870 of FIGS. 8 and 9. As further described above, in various implementations, the XY scale 170A comprises a nominally planar substrate SUB (e.g., arranged nominally perpendicular to the scale imaging axis direction SIA' when in the operational configuration) and a plurality of respective imageable features IIF that are distributed on the substrate SUB, wherein the respective imageable features IFF are located at respective known XY scale coordinates (e.g., x and y coordinates) on the XY scale 170A (i.e., thus each corresponding to a known XY scale coordinate location). In the example implementation of FIG. 4, the array of incremental imageable features IIF are evenly spaced. In various implementations, metrology position coordinates corresponding to a location of a field of view FOV of the first imaging configuration 160-1 within the incremental XY scale 170A may provide an indication of a relative position between the XY scale 170A and the first reference position REF1'.

More specifically, in various implementations, a single imageable feature IFF on the XY scale 170A (e.g., wherein the imageable features are all at known metrology position coordinates, such as known x and y metrology position coordinates, on the XY scale 170A according to the even spacings across the scale) may thus be identified by the robot position data with sufficient accuracy so that no two imageable features IFF may be confused with one another. In such a configuration, the location of a single imageable feature IFF in the acquired image may then be utilized to further refine the end tool position ETP' to have an accuracy that is better than the robot accuracy, at least for a vector component of the metrology position coordinates that is at least one of transverse or perpendicular to the scale imaging axis direction (e.g., at least for x and y metrology position coordinates of the end tool position ETP' in an x-y plane that is perpendicular to the z axis).

It will be appreciated that in accordance with standard camera/scale image processing techniques, the reference position/origin location X0, Y0, Z0 is not required to be in the field of view FOV for such a determination to be made (i.e., the metrology position coordinates that indicate the relative position may be determined from the scale information at any location along the XY scale 170A, as provided in part by the scale elements comprising the evenly spaced incremental imageable features IIF). In various implementations, such a determination may include identifying at least one respective imageable feature included in the acquired image of the XY scale 170A and the related respective known XY scale coordinate location. Such a determination may correspond to determining metrology position coordinates that indicate a relative position between the XY scale 170A and the first reference position REF1' (i.e., as defined by the stationary first imaging configuration 860-1). The relative X2, Y2 coordinates (i.e., of the end tool position ETP') may then be determined according to the known coordinate position offset between the end tool position ETP' and the XY scale 170A (e.g., adding the x and y position offset values to X1 and Y1 in order to determine X2 and Y2).

As described above, in various implementations the absolute XY scale 170B of FIG. 5 may alternatively be utilizable as the XY scale 870 of FIGS. 8 and 9. As noted above, the absolute XY scale 170B includes an array of evenly spaced incremental imageable features IIF, and also includes a set of absolute imageable features AIF having unique identifiable patterns (e.g., a 16-bit pattern). In various implementations, the imageable features IIF and AIF are all located at respective known metrology position coordinates (e.g., x and y coordinates) on the XY scale (i.e., thus each corresponding to a known XY scale coordinate location). As further described above, such implementations are able to independently determine an absolute position that is indicative of the end tool position ETP' with an accuracy that is better than the robot accuracy, at least for a vector component of the metrology position coordinates that is at least one of transverse or perpendicular to the scale imaging axis direction (e.g., for x and y metrology position coordinates of the end tool position ETP' in an x-y plane that is perpendicular to the z axis), and which in contrast to the incremental XY scale 170A may not require combining with position information from the robot 110 or 810 to determine the absolute position.

Figure 10A:
FIGS. 10A and 10B are flow diagrams illustrating second exemplary implementations of routines for operating a robot system including a robot and a supplementary metrology position coordinates determination system.
Figure 10B:
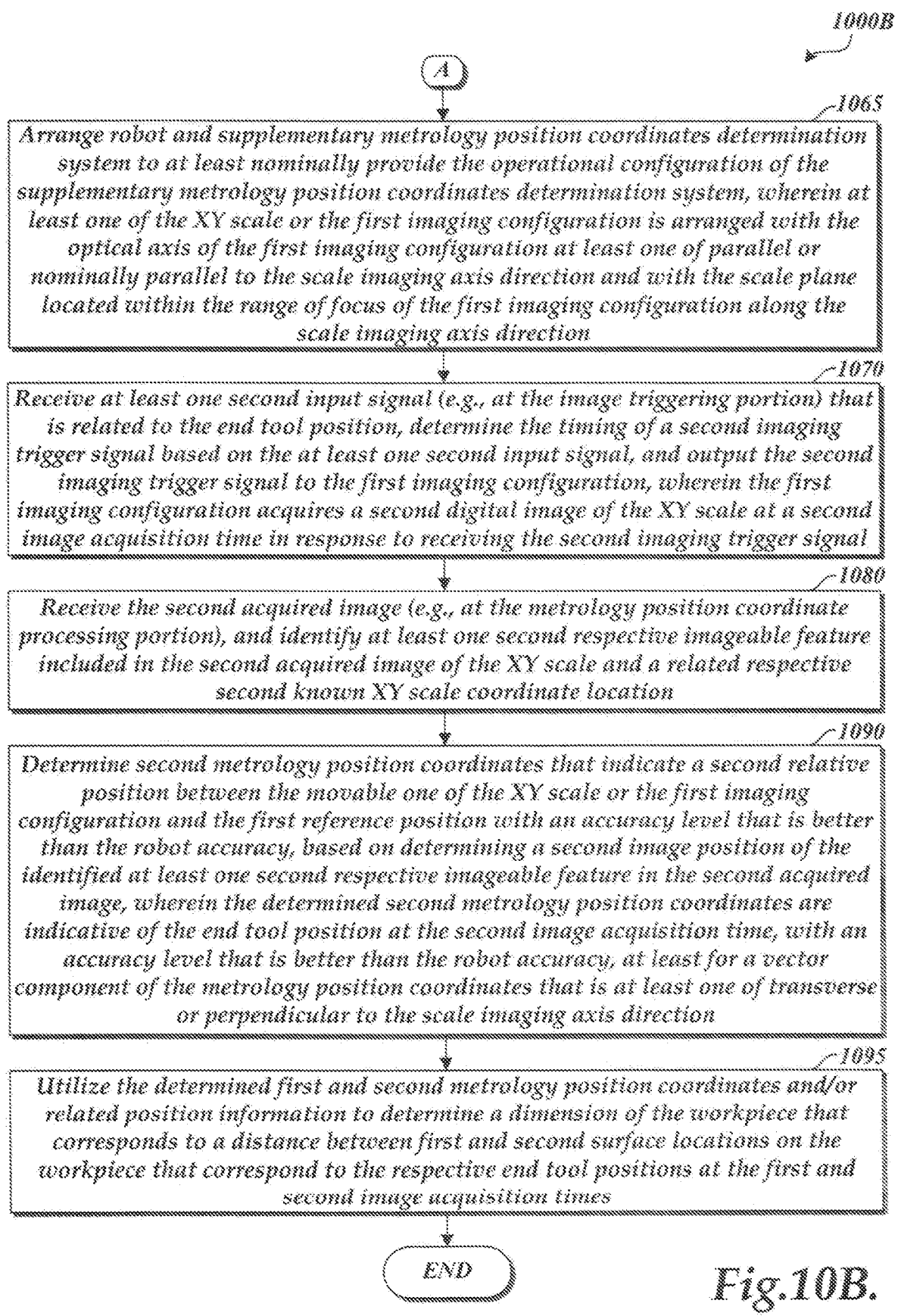

FIGS. 10A and 10B are flow diagrams illustrating exemplary implementations of routines 1000A and 1000B for operating a robot system including a robot and a supplementary metrology position coordinates determination system. As shown in FIG. 10A, at a decision block 1010, a determination is made as to whether the robot system is to be operated in a supplementary metrology position coordinates mode. In various implementations, a selection and/or activation of a supplementary metrology position coordinates mode or a standard robot position coordinates mode may be made by a user and/or may be automatically made by the system in response to certain operations and/or instructions. For example, in one implementation a supplementary metrology position coordinates mode may be entered (e.g., automatically or in accordance with a selection by a user) when the robot moves into a particular position (e.g., moves an end tool from a general area where assembly or other operations are performed to a more specific area where workpiece inspection operations are typically performed and/or where the supplementary metrology position coordinates mode would otherwise be utilized). In various implementations, such modes may be implemented by an external control system (e.g., such as the external control system ECS of FIG. 1 utilizing a standard robot position coordinates mode portion 147 and a supplementary metrology position coordinates mode portion 192 or the external control system ECS' of FIG. 8 utilizing a standard robot position coordinates mode portion 849 and a supplementary metrology position coordinates mode portion 892). In various implementations, a hybrid mode may be operated either independently or as part of a supplementary metrology position coordinates mode and/or may be implemented as a switching between the modes, as will be described in more detail below with respect to FIG. 11.

If at the decision block 1010 it is determined that the robot system is not to be operated in a supplementary metrology position coordinates mode, the routine proceeds to a block 1015, where the robot system is operated in a standard robot position coordinates mode. As part of the standard robot position coordinates mode, the position sensors (e.g., rotary encoders, linear encoders, etc.) of the robot are utilized to control and determine the robot movements and corresponding end tool position with the robot accuracy (e.g., which is based at least in part on the accuracy of the position sensors of the robot). As noted above with respect to FIGS. 1-5, 8 and 9, the position sensors of the robot may indicate the position of the movable arm configuration MAC or MAC' (e.g., the positions of the arm portions) with a lower degree of accuracy than the position information that is determined utilizing the XY scale. In general, the robot position coordinates mode may correspond to an independent and/or standard mode of operation for the robot (e.g., a mode in which the robot is operated independently, such as when a supplementary metrology position coordinates determination system is not active or is otherwise not provided).

If the robot system is to be operated in a supplementary metrology position coordinates mode, the routine proceeds to a block 1020, where the robot and the supplementary metrology position coordinates determination system are arranged to at least nominally provide an operational configuration of the supplementary metrology position coordinates determination system. A scale plane is defined to nominally coincide with the planar substrate of the XY scale, and a direction normal to the scale plane is defined as a scale imaging axis direction. At least one of the XY scale or the first imaging configuration is arranged with the optical axis of the first imaging configuration at least one of parallel or nominally parallel to the direction of the scale imaging axis direction and with the scale plane located within the range of focus of the first imaging configuration along the scale imaging axis direction.

As described above, in various implementations this process for at least nominally achieving the operational configuration may include making various adjustments (e.g., to the positions of the arm portions of the movable arm configuration MAC, or MAC', etc.) As one specific example, in the implementations of FIGS. 8 and 9, the fourth motion mechanism 834 may be operated to rotate the fourth arm portion 824 so as to rotate the XY scale 870 to cause the scale imaging axis direction SIA' to be at least one of parallel or nominally parallel to the optical axis OA1'. In certain implementations, such adjustments may be made automatically or otherwise (e.g., a circuit, routine, etc. may be utilized to continually or otherwise monitor the orientation of the fourth arm portion 824 and to utilize the fourth motion mechanism 834 to continually or otherwise adjust the orientation to cause the XY scale 870 to be approximately level or otherwise have the scale imaging axis direction SIA' be at least one of parallel or nominally parallel to the optical axis OA1'). In various implementations, various adjustments may be made to the first imaging configuration 860-1 (e.g., the magnification and/or range of focus may be adjusted, etc.) so as to cause the scale plane to be located within the range of focus of the first imaging configuration 860-1 along the scale imaging axis direction SIA'. In certain other implementations (e.g., in the example configurations of FIGS. 1-3), fewer or no adjustments may sometimes be required to achieve the operational configuration (e.g., the configuration of the movable arm configuration MAC may be such that the scale imaging axis direction SIA is at least nominally parallel to the optical axis OA1, in accordance with the rotation of the first and second arm portions 120 and 130 nominally in an x-y plane in certain implementations).

At a block 1030, at least one input signal is received (e.g., at an image triggering portion, such as the image triggering portion 181, or 881, etc.) that is related to an end tool position of the robot. A timing is determined of a first imaging trigger signal based on the at least one input signal and the first imaging trigger signal is output to a first imaging configuration. The first imaging configuration acquires a digital image of an XY scale at an image acquisition time in response to receiving the first imaging trigger signal. In various implementations, different types of end tools may provide different types of outputs that may be utilized with respect to the at least one input signal. For example, in an implementation where the end tool is a touch probe that is used for measuring a workpiece and that outputs a touch signal when it touches the workpiece, that touch signal or a signal derived therefrom may be input as the at least one input signal that the timing of a first imaging trigger signal is determined based on. As another example, in an implementation where the end tool is a scanning probe that is used for measuring a workpiece and that provides respective workpiece measurement sample data corresponding to a respective sample timing signal, that respective sample timing signal or a signal derived therefrom may be input as the at least one input signal. As another example, in an implementation where the end tool is a camera that is used to provide a respective workpiece measurement image corresponding to a respective workpiece image acquisition signal, that workpiece image acquisition signal or a signal derived therefrom may be input as the at least one input signal.

At a block 1040, the acquired image is received (e.g., at a metrology position coordinate processing portion, such as the metrology position coordinate processing portion 190, or 890, etc.), and at least one respective imageable feature included in the acquired image of the XY scale and the related respective known XY scale coordinate location are identified. At a block 1050, metrology position coordinates that indicate a relative position between a movable one of the XY scale or the first imaging configuration and the first reference position are determined with an accuracy level that is better than a robot accuracy, based on determining an image position of the identified at least one respective imageable feature in the acquired image. The determined metrology position coordinates are indicative of the end tool position at the image acquisition time, with an accuracy level that is better than the robot accuracy, at least for a vector component of the metrology position coordinates that is at least one of transverse or perpendicular to the scale imaging axis direction. At a block 1060, determined position information (e.g., the determined metrology position coordinates that are indicative of the relative position, the determined metrology position coordinates of the end tool position, and/or other related determined position information) is utilized for a designated function (e.g., for workpiece measurement, positioning control of the movable arm configuration of the robot, etc.) As part of such operations or otherwise, the routine may then proceed to a point A, where in various implementations the routine may end, or may otherwise continue as will be described in more detail below with respect to FIG. 10B.

As indicated in FIG. 10B, the routine 1000B may continue from the point A to a block 1065. As will be described in more detail below, as part of the routine 1000B, the determined position information (e.g., from the block 1060) may correspond to or otherwise be utilized for determining a first surface location on a workpiece, and for which a second surface location on the workpiece may then be determined (e.g., as part of a workpiece measurement such as measuring a feature of a workpiece). At the block 1065, the robot and the supplementary metrology position coordinates determination system are arranged to at least nominally provide the operational configuration of the supplementary metrology position coordinates determination system, wherein at least one of the XY scale or the first imaging configuration is arranged with the optical axis of the first imaging configuration at least one of parallel or nominally parallel to the direction of the scale imaging axis direction and with the scale plane located within the range of focus of the first imaging configuration along the scale imaging axis direction. For example, in the implementation of FIGS. 8 and 9, this may correspond to the movable arm configuration MAC' moving the end tool ETL (e.g., and contact point CP) proximate to (e.g., above) a second surface location on a workpiece, for which an adjustment may be made (e.g., by the fourth motion mechanism 834 for adjusting the orientation of the XY scale 870) in order to at least nominally achieve the operational configuration proximate to the second surface location on the workpiece. As noted above, in certain other implementations (e.g., in the example configurations of FIGS. 1-3), fewer or no adjustments may sometimes be required to achieve the operational configuration (e.g., the configuration of the movable arm configuration MAC may be such that the scale imaging axis direction SIA is at least nominally parallel to the optical axis OA1, in accordance with the rotation of the first and second arm portions 120 and 130 nominally in an x-y plane in certain implementations).

At a block 1070, at least one second input signal is received (e.g., at the image triggering portion, such as the image triggering portion 181, or 881, etc.) that is related to the end tool position and the timing of a second imaging trigger signal is determined based on the at least one second input signal. The second imaging trigger signal is output to the first imaging configuration, wherein the first imaging configuration acquires a second digital image of the XY scale at a second image acquisition time in response to receiving the second imaging trigger signal. At a block 1080, the acquired image is received (e.g., at the metrology position coordinate processing portion, such as the metrology position coordinate processing portion 190, or 890, etc.), and at least one second respective imageable feature included in the second acquired image of the XY scale and a related respective second known XY scale coordinate location are identified.

At a block 1090, second metrology position coordinates that are indicative of a second relative position between the movable one of the XY scale or the first imaging configuration and the first reference position are determined with an accuracy level that is better than the robot accuracy, based on determining a second image position of the identified at least one second respective imageable feature in the second acquired image. The second determined metrology position coordinates are indicative of the end tool position at the second image acquisition time, with an accuracy level that is better than the robot accuracy, at least for a vector component of the second metrology position coordinates that is at least one of transverse or perpendicular to the scale imaging axis direction. The second relative position is different than the first relative position, and corresponds to a second surface location on the workpiece that is different than the first surface location (e.g., and for which the first respective imageable feature may not be included in the second acquired image and/or the second respective imageable feature may not be included in the first acquired image). Such techniques are noted to be distinct from techniques utilizing fiducials or other reference marks (e.g., for which the same fiducial or reference mark is required to be in each image, as compared to an XY scale 170 or 870 for which position information may be determined across the entire range of the XY scale 170 or 870 and correspondingly for any portion of the XY scale 170 or 870 that is included in an image corresponding to a field of view FOV or FOV' of an imaging configuration 160 or 860).

At a block 1095, the first and second determined metrology position coordinates that are indicative of the first and second relative positions and/or related position information are utilized to determine a dimension of the workpiece that corresponds to a distance between the first and second surface locations on the workpiece that correspond to the respective end tool positions (e.g., as indicating the contact point positions when contacting the respective first and second surface locations on the workpiece, etc.) at the first and second image acquisition times. It will be appreciated that rather than using the position sensors (e.g., rotary encoders, linear encoders, etc.) of the robot to determine the first and second surface locations on the workpiece with the robot accuracy, more accurate position information may be determined utilizing the techniques as described herein. More specifically, the determination of the first and second surface locations (i.e., as corresponding to the first and second determined metrology position coordinates which correspond to respective first and second locations on the XY scale for which a precise distance between such coordinates/locations may be determined utilizing the techniques as described above in accordance with the accuracy of the XY scale) allows the corresponding dimension of the workpiece (e.g., of a workpiece feature) between the first and second surface locations to be determined with a high degree of accuracy.

Figure 11:
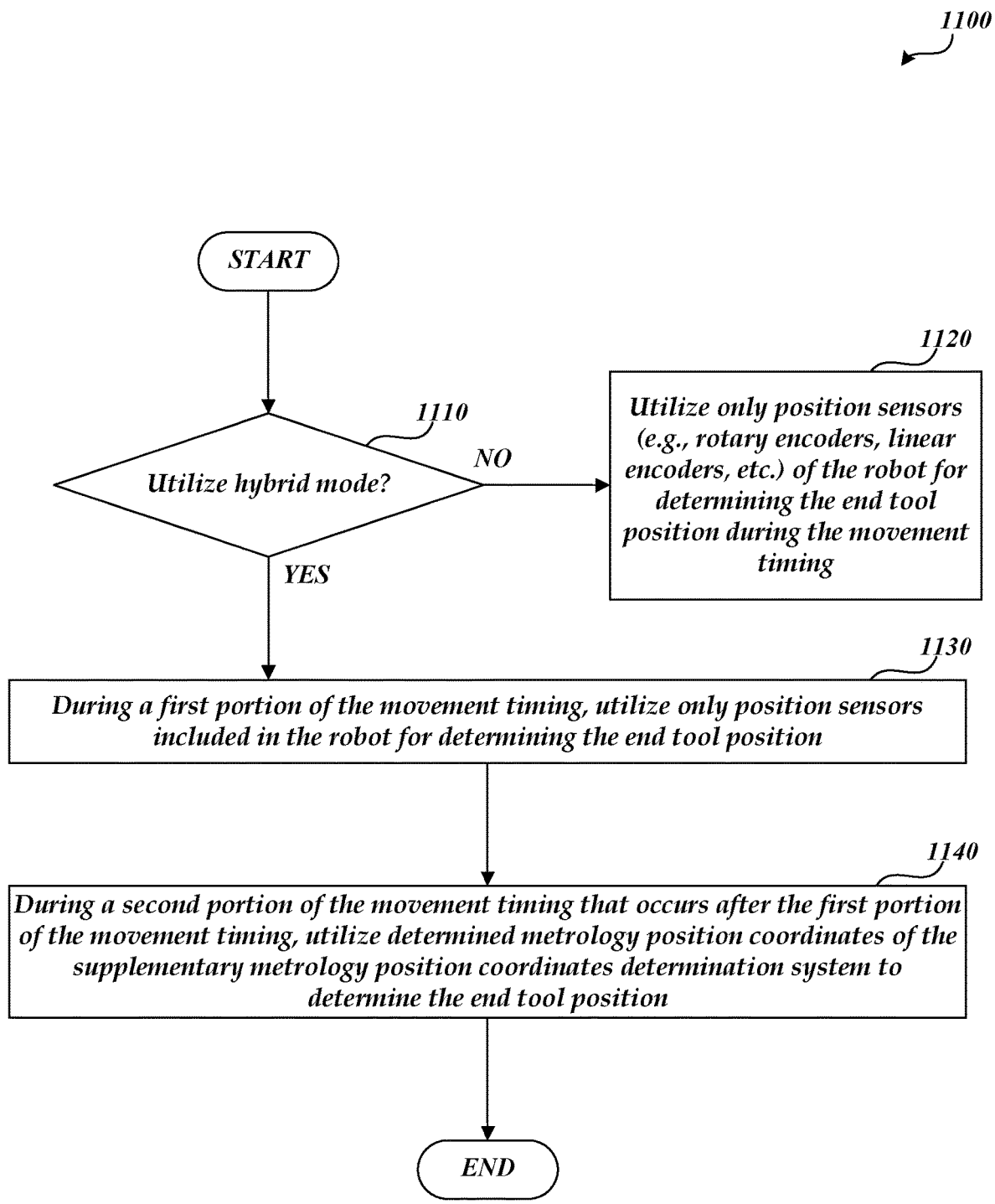
FIG. 11 is a flow diagram illustrating a second exemplary implementation of a routine for determining an end tool position in which position sensors may be utilized during a first portion of a movement timing and determined metrology position coordinates of a supplementary metrology position coordinates determination system may be utilized during a second portion of a movement timing.

FIG. 11 is a flow diagram illustrating one exemplary implementation of a routine 1100 for determining an end tool position in which different techniques may be utilized during different portions of a movement timing. In general, during the movement timing one or more arm portions of the robot are moved from first positions to second positions (e.g., which may include rotating one or more arm portions around motion mechanisms from first rotary orientations to second rotary orientations, or otherwise moving the arm portions, etc.) As shown in FIG. 11, at a decision block 1110, a determination is made as to whether a hybrid mode will be utilized for determining the end tool position during the movement timing. In various implementations, a hybrid mode may also be representative of a process which includes switching between the supplementary metrology position coordinates mode and the standard robot position coordinates mode, as described above with respect to FIG. 10A. If the hybrid mode is not to be utilized, the routine continues to a block 1120, where the position sensors (e.g., rotary encoders, linear encoders, etc.) of the robot (e.g., of the movable arm configuration, such as movable arm configuration MAC, or MAC', etc.) are solely utilized for determining the end tool position during the movement timing.

If the hybrid mode is to be utilized, the routine proceeds to a block 1130, for which during a first portion of a movement timing, the position sensors included in the robot (e.g., included in the movable arm configuration MAC or MAC' of the robot) are utilized for determining the end tool position. During such operations, metrology position coordinates of a supplementary metrology position coordinates determination system may not be determined and/or are otherwise not utilized to determine the end tool position. At a block 1140, during a second portion of the movement timing that occurs after the first portion of the movement timing, determined metrology position coordinates of the supplementary metrology position coordinates determination system are utilized to determine the end tool position. It will be appreciated that such operations enable the system to perform initial/fast/coarse movement of the end tool position during the first portion of the movement timing, and to perform more accurate final/slower/fine movement of the end tool position during the second portion of the movement timing.

It will be understood that although the element name "XY scale" has been used in this disclosure with reference to the elements 170, 170A, 1708, 870, and the like, this element name is exemplary only, and not limiting. It is referred to as an "XY scale" with reference to a cartesian coordinate system, and its description as comprising a nominally planar substrate (e.g., arranged nominally perpendicular to a scale imaging axis direction, which may be parallel to a z axis in certain implementations). However, more generally, the element name XY scale should be understood to refer to any reference scale comprising a plurality of features or markings that correspond to known two dimensional coordinates on that reference scale (e.g. accurate and/or accurately calibrated locations in two dimensions), provided that the scale is able to operate as disclosed herein. For example, such scale features may be expressed and/or marked to be in a cartesian coordinate system on that reference scale, or in a polar coordinate system, or any other convenient coordinate system. Furthermore, such features may comprise features distributed evenly or unevenly throughout an operational scale area, and may comprise graduated or ungraduated scale markings, provided that such features correspond to known two dimensional coordinates on the scale and are able to operate as disclosed herein.

It will be understood that although the robot systems and corresponding movable arm configurations disclosed and illustrated herein are generally shown and described with reference to a certain number of arm portions (e.g., 3 arm portions, 5 arm portions, etc.), such systems are not so limited. In various implementations, provided that it includes arm portions such as those described and/or claimed herein, the robot system may include fewer or more arm portions if desired.

It will be understood that the XY scale or reference scale and a camera that is used to image the scale may undergo rotation relative to one another, depending on the motion and/or position of the robot system. It will be appreciated that methods known in the art (e.g. as disclosed in the incorporated references) may be used to accurately determine any such relative rotation and/or perform any required coordinate transformations, and/or analyze the relative position of the camera and the scale according to principles disclosed herein, despite such relative rotations. It will be understood that the metrology position coordinates referred to herein may in various implementations take into account any such relative rotation. Furthermore, it will be understood that in some implementations the metrology position coordinates referred to herein may comprise a set of coordinates that include a precise determination and/or indication of any such relative rotation, if desired.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A robot system, comprising:
   a robot, comprising:
      a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and
      a motion control system configured to control an end tool position with a level of accuracy defined as a robot accuracy, based at least in part on sensing and controlling the position of the movable arm configuration using at least one position sensor included in the robot; and
   wherein:
   the robot system further comprises a supplementary metrology position coordinates determination system, comprising:
      a first imaging configuration comprising a first camera, the first imaging configuration having an optical axis;
      an XY scale comprising a nominally planar substrate and a plurality of respective imageable features distributed on the substrate, wherein the respective imageable features are located at respective known XY scale coordinates on the XY scale;
      an image triggering portion configured to input at least one input signal that is related to the end tool position and determine the timing of a first imaging trigger signal based on the at least one input signal and output the first imaging trigger signal to the first imaging configuration, wherein the first imaging configuration is configured to acquire a digital image of the XY scale at an image acquisition time in response to receiving the first imaging trigger signal, and a metrology position coordinate processing portion configured to input the acquired image and identify at least one respective imageable feature included in the acquired image of the XY scale, and the related respective known XY scale coordinate location, and wherein:

the supplementary metrology position coordinates determination system is configured with a movable one of the XY scale or the first imaging configuration coupled to the movable arm configuration and the other configured to be coupled to a stationary element proximate to the robot, with the stationary one of the XY scale or the first imaging configuration defining a first reference position;

a scale plane is defined to nominally coincide with the planar substrate of the XY scale, and a direction normal to the scale plane is defined as a scale imaging axis direction, and the robot system is operable to at least nominally provide an operational configuration of the supplementary metrology position coordinates determination system, wherein in the operational configuration of the supplementary metrology position coordinates determination system at least one of the XY scale or the first imaging configuration is arranged with the optical axis of the first imaging configuration parallel to the direction of the scale imaging axis direction and with the scale plane located within the range of focus of the first imaging configuration along the scale imaging axis direction;

the supplementary metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine metrology position coordinates that indicate a relative position between the movable one of the XY scale or the first imaging configuration and the first reference position with an accuracy level that is better than the robot accuracy, based on determining an image position of the identified at least one respective imageable feature in the acquired image; and the determined metrology position coordinates are indicative of the end tool position at the image acquisition time, with an accuracy level that is better than the robot accuracy, at least for a vector component of the metrology position coordinates that is at least one of transverse or perpendicular to the scale imaging axis direction.

2. The robot system of claim 1, wherein the movable one of the XY scale or the first imaging configuration is coupled to a central sub-portion of the movable arm configuration through a distal sub-portion comprising at least a first distal sub-portion rotating element that rotates about a first distal sub-portion rotation axis that is nominally parallel to the scale plane if the XY scale is the moveable one, and nominally orthogonal to the optical axis if the first imaging configuration is the moveable one.

3. The robot system of claim 2, wherein the central sub-portion comprises at least a first central sub-portion rotating element that rotates about a rotation axis that is nominally parallel to the first distal sub-portion rotation axis.

4. The robot system of claim 2, wherein the distal sub-portion that couples the movable one of the XY scale or the first imaging configuration to the central sub-portion includes no distal sub-portion rotation axis that is nominally orthogonal to the scale plane if the XY scale is the moveable one, and no distal sub-portion rotation axis that is nominally parallel to the optical axis if the first imaging configuration is the moveable one.

5. The robot system of claim 2, wherein the distal sub-portion comprises a bracket that couples the movable one of the XY scale or the first imaging configuration to the first distal sub-portion rotating element.

6. The robot system of claim 1, wherein the robot is configured to move the movable one of the XY scale or the first imaging configuration in a plane parallel to the scale plane, while the supplementary metrology position coordinates determination system is in the operational configuration.

7. The robot system of claim 1, wherein when the end tool is a touch probe that is used for measuring a workpiece and that outputs a touch signal when it touches the workpiece, the image triggering portion is configured to input that touch signal or a signal derived therefrom as its at least one input signal.

8. The robot system of claim 7, wherein the end tool is configured with a central axis of the touch probe nominally parallel to the scale imaging axis direction, at least while the supplementary metrology position coordinates determination system is in the operational configuration.

9. The robot system of claim 1, wherein when the end tool is a scanning probe that is used for measuring a workpiece and that provides respective workpiece measurement sample data corresponding to a respective sample timing signal, the image triggering portion is configured to input that respective sample timing signal or a signal derived therefrom as its at least one input signal.

10. The robot system of claim 1, wherein when the end tool is a camera that is used to provide a respective workpiece measurement image corresponding to a respective workpiece image acquisition signal, the image triggering portion is configured to input that workpiece image acquisition signal or a signal derived therefrom as its at least one input signal.

11. The robot system of claim 1, wherein the supplementary metrology position coordinates determination system is configured to determine the metrology position coordinates of the end tool position at the image acquisition time, based on the determined metrology position coordinates that are indicative of the relative position of the movable one of the XY scale or the first imaging configuration and a known coordinate position offset between the end tool position and the movable one of the XY scale or the first imaging configuration.

12. The robot system of claim 1, wherein the XY scale is coupled to the movable arm configuration and the first imaging configuration is coupled to the stationary element.

13. The robot system of claim 12, wherein the stationary element comprises a frame arranged above at least a portion of the end tool working volume, and the first imaging configuration is fixed to the frame above a portion of the end tool working volume.

14. The robot system of claim 1, wherein:
the respective imageable features of the XY scale comprise a set of imageable features having unique identifiable patterns, wherein that set of imageable features are distributed on the substrate such that they are spaced apart by less than a distance corresponding to a distance across a field of view of the first imaging configuration; and the metrology position coordinate processing portion is configured to identify at least one respective imageable feature included in the acquired image of the XY scale based on its unique identifiable pattern.

15. The robot system of claim 1, wherein the metrology position coordinate processing portion is configured to identify at least one respective imageable feature included in the acquired image of the XY scale based on its image position in the acquired image and based on robot position data derived from the motion control system corresponding to the image acquisition time.

16. The robot system of claim 15, wherein the respective imageable features of the XY scale comprise a set of similar imageable features that are distributed on the substrate such that they are spaced apart from one another by a distance that is more than a maximum position error that is allowed within the robot accuracy.

17. A method for operating a supplementary metrology position coordinates determination system that is utilized with a robot, the robot comprising:
a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and a motion control system configured to control an end tool position with a level of accuracy defined as a robot accuracy, based at least in part on sensing and controlling the position of the movable arm configuration using at least one position sensor included in the robot;

the supplementary metrology position coordinates determination system comprising:
a first imaging configuration comprising a first camera, the first imaging configuration having an optical axis;
an XY scale comprising a nominally planar substrate and a plurality of respective imageable features distributed on the substrate, wherein the respective imageable features are located at respective known XY scale coordinates on the XY scale;
an image triggering portion; and
a metrology position coordinate processing portion, wherein:
the supplementary metrology position coordinates determination system is configured with a movable one of the XY scale or the first imaging configuration coupled to the movable arm configuration and the other configured to be coupled to a stationary element proximate to the robot, with the stationary one of the XY scale or the first imaging configuration defining a first reference position; and
a scale plane is defined to nominally coincide with the planar substrate of the XY scale, and a direction normal to the scale plane is defined as a scale imaging axis direction, and the robot system is operable to at least nominally provide an operational configuration of the supplementary metrology position coordinates determination system, wherein in the operational configuration of the supplementary metrology position coordinates determination system at least one of the XY scale or the first imaging configuration is arranged with the optical axis of the first imaging configuration parallel to the direction of the scale imaging axis direction and with the scale plane located within the range of focus of the first imaging configuration along the scale imaging axis direction;

the method comprising:
receiving at the image triggering portion at least one input signal that is related to the end tool position and determining the timing of a first imaging trigger signal based on the at least one input signal and outputting the first imaging trigger signal to the first imaging configuration, wherein the first imaging configuration acquires a digital image of the XY scale at an image acquisition time in response to receiving the first imaging trigger signal, and for which the supplementary metrology position coordinates determination system is at least nominally in the operational configuration when the digital image is acquired;

receiving at the metrology position coordinate processing portion the acquired image and identifying at least one respective imageable feature included in the acquired image of the XY scale, and the related respective known XY scale coordinate location; and determining metrology position coordinates that are indicative of a relative position between the movable one of the XY scale or the first imaging configuration and the first reference position, based on determining an image position of the identified at least one respective imageable feature in the acquired image, wherein the determined metrology position coordinates are indicative of the end tool position at the image acquisition time, with an accuracy level that is better than the robot accuracy, at least for a vector component of the metrology position coordinates that is at least one of transverse or perpendicular to the scale imaging axis direction.

18. The method of claim 17, further comprising utilizing the determined metrology position coordinates that indicate the relative position for measuring a feature of a workpiece.

19. The method of claim 18, wherein the relative position is a first relative position which corresponds to a first surface location on the workpiece, and the method further comprises:
receiving at the image triggering portion at least one second input signal that is related to the end tool position and determining the timing of a second imaging trigger signal based on the at least one second input signal and outputting the second imaging trigger signal to the first imaging configuration, wherein the first imaging configuration acquires a second digital image of the XY scale at a second image acquisition time in response to receiving the second imaging trigger signal, and for which the supplementary metrology position coordinates determination system is at least nominally in the operational configuration when the second digital image is acquired;
receiving at the metrology position coordinate processing portion the second acquired image and identifying at least one second respective imageable feature included in the second acquired image of the XY scale, and a related respective second known XY scale coordinate location;

determining metrology position coordinates that indicate a second relative position between the movable one of the XY scale or the first imaging configuration and the first reference position, based on determining a second image position of the identified at least one second respective imageable feature in the second acquired image, wherein the determined metrology position coordinates are indicative of the end tool position at the second image acquisition time, with an accuracy level that is better than the robot accuracy, at least for a vector component of the metrology position coordinates that is at least one of transverse or perpendicular to the scale imaging axis direction, and the second relative position is different than the first relative position and corresponds to a second surface location on the workpiece that is different than the first surface location; and utilizing the determined metrology position coordinates that are indicative of the first and second relative positions to determine a dimension of the workpiece that corresponds to a distance between the first and second surface locations on the workpiece.

20. A supplementary metrology position coordinates determination system for use with a robot, the supplementary metrology position coordinates determination system comprising:

a first imaging configuration comprising a first camera, the first imaging configuration having an optical axis;

an XY scale comprising a nominally planar substrate and a plurality of respective imageable features distributed on the substrate, wherein the respective imageable features are located at respective known XY scale coordinates on the XY scale;

an image triggering portion configured to input at least one input signal that is related to an end tool position of a robot and determine the timing of a first imaging trigger signal based on the at least one input signal and output the first imaging trigger signal to the first imaging configuration, the robot including a movable arm configuration with an end tool mounting configuration and a motion control system configured to control an end tool position of an end tool with a level of accuracy defined as a robot accuracy, based at least in part on sensing and controlling the position of the movable arm configuration using at least one position sensor included in the robot, wherein the first imaging configuration is configured to acquire a digital image of the XY scale at an image acquisition time in response to receiving the first imaging trigger signal; and a metrology position coordinate processing portion configured to input the acquired image and identify at least one respective imageable feature included in the acquired image of the XY scale, and the related respective known XY scale coordinate location, wherein:

the supplementary metrology position coordinates determination system is configured with a movable one of the XY scale or the first imaging configuration coupled to the movable arm configuration and the other configured to be coupled to a stationary element proximate to the robot, with the stationary one of the XY scale or the first imaging configuration defining a first reference position;

a scale plane is defined to nominally coincide with the planar substrate of the XY scale, and a direction normal to the scale plane is defined as a scale imaging axis direction, and in an operational configuration of the supplementary metrology position coordinates determination system at least one of the XY scale or the first imaging configuration is arranged with the optical axis of the first imaging configuration parallel to the direction of the scale imaging axis direction and with the scale plane located within the range of focus of the first imaging configuration along the scale imaging axis direction;

the supplementary metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine metrology position coordinates that indicate a relative position between the movable one of the XY scale or the first imaging configuration and the first reference position with an accuracy level that is better than the robot accuracy, based on determining an image position of the identified at least one respective imageable feature in the acquired image; and the determined metrology position coordinates are indicative of the end tool position at the image acquisition time, with an accuracy level that is better than the robot accuracy, at least for a vector component of the metrology position coordinates that is at least one of transverse or perpendicular to the scale imaging axis direction.

21. The supplementary metrology position coordinates determination system of claim 20, wherein the XY scale is coupled to the movable arm configuration and the first imaging configuration is coupled to the stationary element.

* * * * *